United States Patent
Lin et al.

(10) Patent No.: US 9,933,639 B1
(45) Date of Patent: Apr. 3, 2018

(54) ELECTRO-ABSORPTION MODULATION WITH AN INTEGRATED PHOTODETECTOR

(71) Applicant: Xilinx, Inc., San Jose, CA (US)

(72) Inventors: Sen Lin, Albany, CA (US); Kun-Yung Chang, Los Altos Hills, CA (US); Austin H. Lesea, Los Gatos, CA (US)

(73) Assignee: XILINX, INC., San Jose, CA (US)

( * ) Notice: Subject to any disclaimer, the term of this patent is extended or adjusted under 35 U.S.C. 154(b) by 0 days.

(21) Appl. No.: 15/346,521

(22) Filed: Nov. 8, 2016

(51) Int. Cl.
| G02F 1/035 | (2006.01) |
| G02F 1/025 | (2006.01) |
| H04B 10/54 | (2013.01) |
| H04B 10/80 | (2013.01) |
| G02F 1/01  | (2006.01) |
| G02F 1/015 | (2006.01) |

(52) U.S. Cl.
CPC ............ *G02F 1/025* (2013.01); *G02F 1/0147* (2013.01); *H04B 10/541* (2013.01); *H04B 10/801* (2013.01); *H04B 10/807* (2013.01); *G02F 2001/0155* (2013.01); *G02F 2201/58* (2013.01)

(58) Field of Classification Search
None
See application file for complete search history.

(56) References Cited

U.S. PATENT DOCUMENTS

| 6,233,082 B1* | 5/2001 | Johnson ............... H01S 5/0265 359/237 |
| 2011/0058765 A1* | 3/2011 | Xu .......................... G02F 1/025 385/2 |
| 2015/0132015 A1* | 5/2015 | Hayakawa ............. G02F 1/025 398/200 |
| 2015/0263190 A1* | 9/2015 | Knights .................. G02F 1/011 250/201.1 |
| 2016/0155863 A1* | 6/2016 | Baehr-Jones ....... H01L 31/1808 250/338.4 |
| 2017/0082876 A1* | 3/2017 | Jones ................... G02F 1/01708 |
| 2017/0092785 A1* | 3/2017 | Novack .................... H01L 27/14 |
| 2017/0155451 A1* | 6/2017 | Hayakawa ........... H04B 10/516 |
| 2017/0155452 A1* | 6/2017 | Nagra .................. H04B 10/541 |

OTHER PUBLICATIONS

Sun, Chen et al., "A 45 nm CMOS-SOI Monolithic Photonics Platform With Bit-Statistics-Based Resonant Microring Thermal Tuning," IEEE Journal of Solid-State Circuit (JSSC), Apr. 2016, vol. 51, Issue 4 pp. 893-907, IEEE, Piscataway, New Jersey, USA.

(Continued)

*Primary Examiner* — Sung Pak
(74) *Attorney, Agent, or Firm* — W. Eric Webostad; David O'Brien

(57) ABSTRACT

Systems, and related methods, relating generally to electro-absorption modulation are described. In a system therefor, there is a waveguide. A photodetector is configured with respect to the waveguide for detecting luminous intensity of an optical signal. An electro-absorption modulator is configured with respect to the waveguide for electro-absorption modulation of the optical signal. An integrated heating element is located alongside and spaced apart from both the photodetector and the electro-absorption modulator. the integrated heating element is configured for controllably heating the photodetector and the electro-absorption modulator.

20 Claims, 21 Drawing Sheets

(56) References Cited

OTHER PUBLICATIONS

Tektronix, "PAM4 Signaling in High Speed Serial Technology: Test, Analysis, and Debug," Oct. 2015, pp. 1-28, Tektronix, Santa Clara, California, USA.
Bakopoulos, Paraskevas et al., "120 Gb/s and 80 Gb/s PAM-4 Optical Interconnect with a Sub-Volt Driven EAM," Oct. 19, 2015, Asia Communications and Photonics Conference, The Optical Society (OSA), Washington, DC, USA.
Specification and drawings for U.S. Appl. No. 15/346,474, filed Nov. 8, 2016, Lin et al.

* cited by examiner

US 9,933,639 B1

ELECTRO-ABSORPTION MODULATION WITH AN INTEGRATED PHOTODETECTOR

TECHNICAL FIELD

The following description relates to integrated circuit devices ("ICs"). More particularly, the following description relates to electro-absorption modulation with an integrated photodetector for a photonic IC.

BACKGROUND

Electro-absorption modulation may be used in energy-efficient high-speed optical interconnects. Electro-absorption modulation modulates light by electrically changing an absorption coefficient of a waveguide material (e.g. GeSi). However, such an absorption coefficient of a waveguide material may change with temperature, which can be detrimental for optical modulation.

SUMMARY

A system relates generally to electro-absorption modulation. In such a system, there is a waveguide. A photodetector is configured with respect to the waveguide for detecting luminous intensity of an optical signal. An electro-absorption modulator is configured with respect to the waveguide for electro-absorption modulation of the optical signal. An integrated heating element is located alongside and spaced apart from both the photodetector and the electro-absorption modulator. The integrated heating element is configured for controllably heating the photodetector and the electro-absorption modulator.

Another system relates generally to electro-absorption modulation. In such a system, there is a waveguide. An electro-absorption modulator is configured with respect to the waveguide for electro-absorption modulation of an optical signal. A photodetector is located with respect to the waveguide for detecting optical modulation amplitude of the optical signal having modulation by the electro-absorption modulator. The photodetector is spaced apart from an egress side of the electro-absorption modulator being located between the egress end of the waveguide and the egress side of the electro-absorption modulator.

A method relates generally to electro-absorption modulation. In such a method, an optical signal is received by a waveguide at an ingress end thereof. A modulation code corresponding to input data is received by an electro-absorption modulator. Luminous intensity is detected with a first photodetector of the optical signal for providing a first photocurrent signal proportional to the detected luminous intensity. The optical signal passing through the waveguide is electro-absorption modulated with the electro-absorption modulator. Optical modulation amplitude is detected with a second photodetector for the optical signal for association with a data eye of the optical signal for providing a second photocurrent signal proportional to the detected optical modulation amplitude. The optical signal is output at an egress end of the waveguide as the optical signal modulated responsive to the electro-absorption modulation for the modulation code.

Other features will be recognized from consideration of the Detailed Description and Claims, which follow.

BRIEF DESCRIPTION OF THE DRAWINGS

Accompanying drawings show exemplary apparatus(es) and/or method(s). However, the accompanying drawings should not be taken to limit the scope of the claims, but are for explanation and understanding only.

FIGS. 3-1 and 3-2 are respective block diagrams illustratively depicting end cross-sectional views of respective exemplary SEASs each having a SEAM.

FIGS. 5-1 through 5-4 are block diagrams of top-down cross-sectional views illustratively depicting respective exemplary SEAS's with a various configurations of an optional integrated heater.

FIG. 6-1 through 6-4 are block diagrams of top-down cross-sectional views illustratively depicting other exemplary SEAS's with an optional integrated heater.

FIGS. 10-1 through 10-3 are respective block diagrams illustratively depicting end cross-sectional views of respective exemplary SEASs each having a SEAM with an optional integrated heater.

FIGS. 11-1 and 11-2 are respective block diagrams of top-down cross-sectional views illustratively depicting respective exemplary SEASs each with an optional integrated heater such as for the SEAS of FIG. 10-3.

DETAILED DESCRIPTION

In the following description, numerous specific details are set forth to provide a more thorough description of the specific examples described herein. It should be apparent, however, to one skilled in the art, that one or more other examples and/or variations of these examples may be practiced without all the specific details given below. In other instances, well known features have not been described in detail so as not to obscure the description of the examples herein. For ease of illustration, the same number labels are used in different diagrams to refer to the same items; however, in alternative examples the items may be different.

Exemplary apparatus(es) and/or method(s) are described herein. It should be understood that the word "exemplary" is used herein to mean "serving as an example, instance, or illustration." Any example or feature described herein as "exemplary" is not necessarily to be construed as preferred or advantageous over other examples or features.

Before describing the examples illustratively depicted in the several figures, a general introduction is provided to further understanding.

In order to use electro-absorption modulation in a datacenter or other thermally controlled environment, temperature may be stabilized using thermal control loops. Along those lines, conventional optical modulators may use additional optical drop ports and separate sensing photodiodes for power sensing and thermal control, namely optical modulators not using electro-absorption modulation. However, the additional optical drop ports and separate sensing photodiodes used in such conventional optical modulators consume area and may complicate layout and system design.

As described below in additional detail, an electro-absorption modulator ("EAM") may be used for a thermal control loop more efficiently than such conventional optical modulators using an additional optical drop port and a separate photodiode. An EAM may have an integrated sensing photodiode ("PD"). By having an integrated PD, such an EAM facilitates a closely coupled thermal control feedback loop for thermal control and/or data eye control for electro-absorption modulation adjustment, as well as reduces footprint in comparison to an above-mentioned conventional optical modulator.

With the above general understanding borne in mind, various configurations for electro-absorption modulation with an integrated photodetector for a photonic IC are generally described below.

Figure 1:
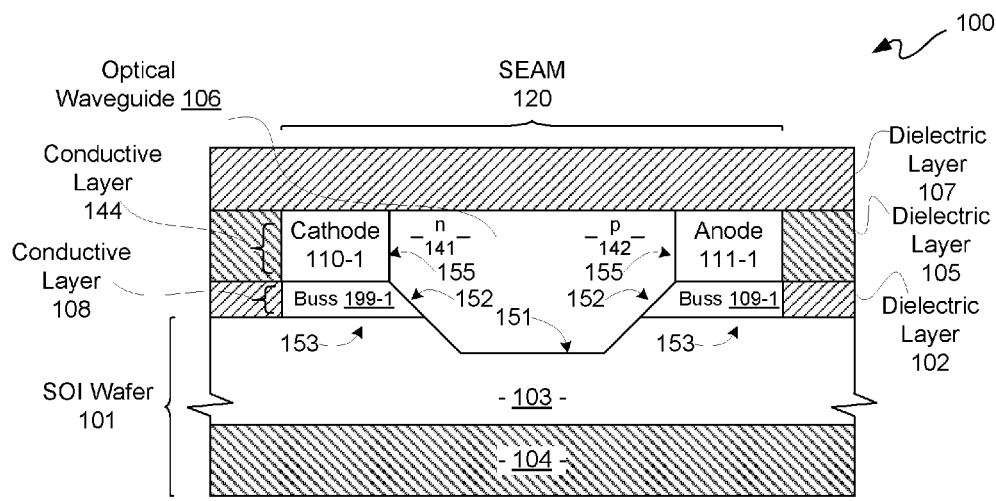
FIG. 1 is a block diagram illustratively depicting an end cross-sectional view of an exemplary segmented electro-absorption system ("SEAS") having a segmented electro-absorption modulator ("SEAM").

FIG. 1 is a block diagram illustratively depicting an end-on cross-sectional view of an exemplary segmented electro-absorption system ("SEAS") 100 having a segmented electro-absorption modulator ("SEAM") 120. SEAS 100 may include more than one SEAM 120, though only one SEAM 120 is illustratively depicted for purposes of clarity and not limitation.

SEAS 100 may include a semiconductor-on-insulator, such as a silicon-on-insulator ("SOI"), wafer or substrate 101 ("SOI wafer 101"). SOI wafer 101 may have an insulative layer 104, such formed with a silicon oxide or other insulator material, and a semiconductor-dielectric layer 103, such as formed with silicon or other semiconductor material, ("silicon layer 103"). Silicon layer 103 may be a single crystalline silicon layer.

A trench 151 may be formed in silicon layer 103 for forming an optical waveguide ("waveguide") 106 in and over trench 151. Along those lines, a doped silicon waveguide layer may be deposited and etched to form waveguide 106. Germanium or other optically active material may be added to such doped silicon waveguide layer, such as by growing GeSi or SiGe or other material with sufficient optical properties, for forming waveguide 106 in, over and above trench 151. Even though trench 151 has a semi-octagonal shape in end profile, other shapes may be used for trench 151 in other implementations.

Adjacent to lower sidewall surfaces 152 on both opposing sides (e.g., right and left sides) of waveguide 106 over an upper surface 153 of silicon layer 103 may be formed a conductive layer 108 to provide anode and cathode contacts respectively for signal busses 109-1 and 199-1. By "adjacent to", it is generally meant next to, in contact with, or sufficiently proximate to a waveguide to allow an electrical field applied to a segment of such a waveguide to affect an absorption coefficient for such segment for electro-absorption, namely by changing an absorption spectrum by applying an electric field. A dielectric layer 102 may be formed over upper surface 153 and patterned for defining locations for conductive layer 108 to provide signal busses 109-1 and 199-1, including contacts therefor. In the above or another implementation, a silicon layer 103 may be implanted, diffused and/or otherwise impregnated with same or different types of dopants for forming signal busses 109-1 and 199-1.

Another dielectric layer 105 may be formed over upper surfaces of dielectric layer 102 and contact layer 108. Dielectric layer 105 may be patterned for defining locations for cathodes and anodes. Along those lines, a cathodic-anodic conductive layer 144 may be deposited or otherwise formed to provide an anode segment 111-1 and a cathode segment 110-1 for bordering upper sidewall surfaces 155 respectively on opposing sides (e.g., right and left sides) of waveguide 106. Anode segment 111-1 may be formed over a contact for signal bus 109-1, and cathode segment 110-1 may be formed over a contact for signal bus 199-1.

A right side of waveguide 106 may be formed with and/or adjusted to have p-type acceptor impurities to provide a p-type region 142 in waveguide 106, and a left side of waveguide 106 may be formed with and/or adjusted to have n-type donor impurities to provide an n-type region 141 in waveguide 106. P-type region 142 may be adjacent to anode segment 111-1 and signal buss 109-1 and may extend inwardly from a right sidewall of waveguide 106 toward the center of waveguide 106. N-type region 141 may be adjacent to cathode segment 110-1 and signal buss 199-1 and may extend inwardly from a left sidewall of waveguide 106 toward the center of waveguide 106.

A dielectric layer 107 may be deposited over upper surfaces of conductive layer 144 and dielectric layer 105, as well as an upper surface of waveguide 106. Anode segment 111-1 and cathode segment 110-1 may provide a portion of a SEAM 120 for waveguide 106.

Figure 2:
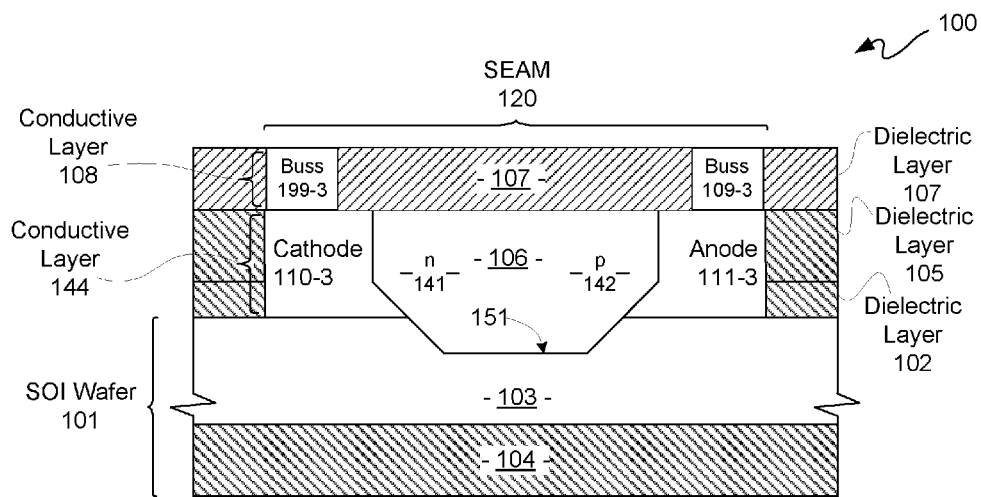
FIG. 2 is a block diagram illustratively depicting an end cross-sectional view of an exemplary SEAS having another SEAM.

FIG. 2 is a block diagram illustratively depicting an end-on cross-sectional view of another exemplary SEAS 100 having another SEAM 120. As many of the details of the description of FIG. 2 are the same as for FIG. 1, those same details are generally not repeated for purposes of clarity and not limitation.

In this implementation, a single dielectric layer 105 or a combination of dielectric layers 102 and 105 may be deposited, and vias may be formed in such one or more dielectric layers such as with one or more via etches. Assuming a single dielectric layer 105 is to include dielectric layer 102 for purposes of clarity and not limitation, dielectric layer 105 may be patterned for defining locations for cathodes and anodes. Via etching may be used to form vias in dielectric layer 105 alongside sidewall surfaces 152 and 155 of waveguide 106 for receipt of conductive material from deposition of conductive layer 144.

Along those lines, a cathodic-anodic conductive layer 144 may be deposited or otherwise formed to provide an anode segment 111-3 and a cathode segment 110-3 bordering sidewall surfaces 152 and 155 respectively on opposing sides (e.g., right and left sides) of waveguide 106. Anode segment 111-3 and cathode segment 110-3 may provide a portion of a SEAM 120 for waveguide 106.

A dielectric layer 107 may be deposited over upper surfaces of conductive layer 144 and dielectric layer 105, as well as an upper surface of waveguide 106. Dielectric layer 107 may be patterned for defining locations for conductive layer 108 to provide signal busses 109-3 and 199-3, including contacts therefor. Contacts for signal busses 109-3 and 199-3 may respectively be formed over anode segment 111-3 and cathode segment 110-3 with deposition of conductive layer 108.

Figures 1, 3:
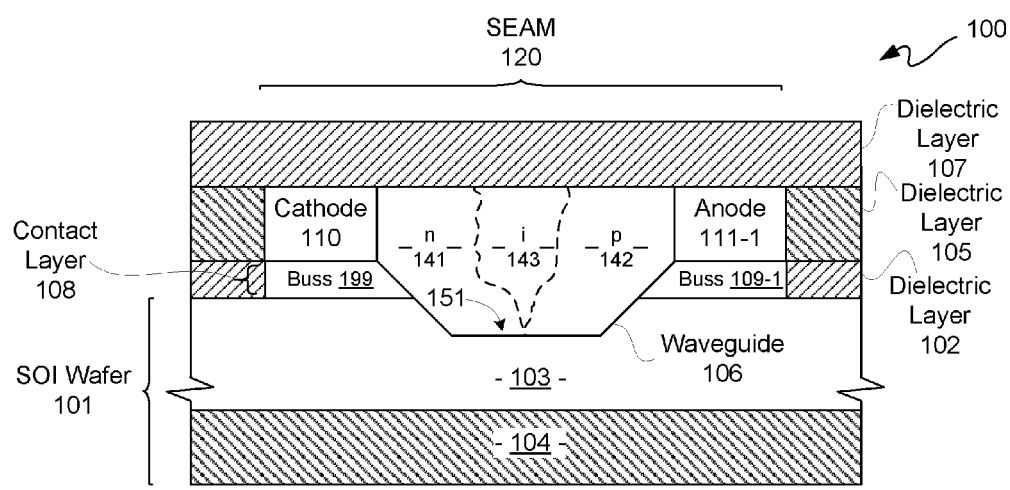
Figures 2, 3:
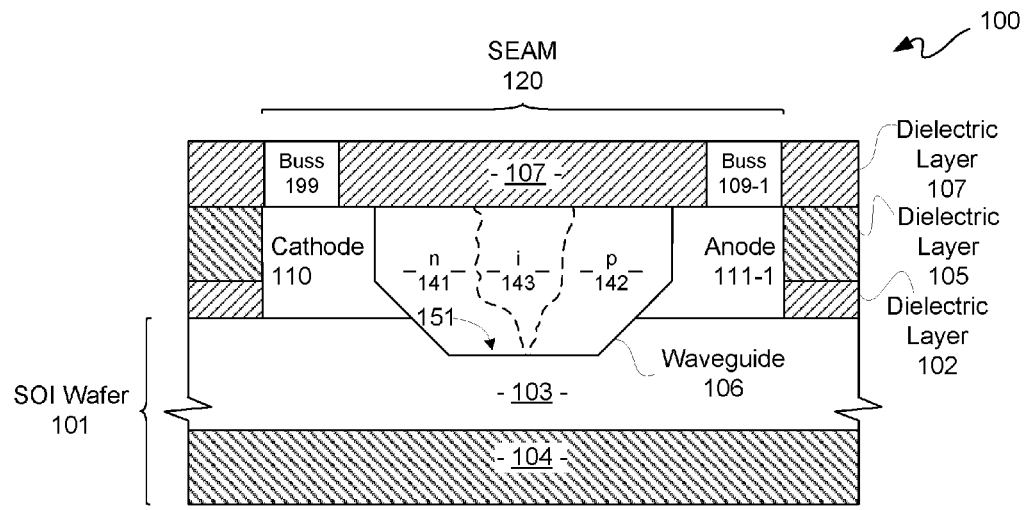

FIGS. 3-1 and 3-2 are respective block diagrams illustratively depicting end cross-sectional views of exemplary SEASs 100 each having a SEAM 120. FIGS. 3-1 and 3-2 respectively correspond to FIGS. 1 and 2, and so generally only the differences are described below for purposes of clarity and not limitation.

In these implementations, an intrinsic or undoped region ("i-region") 143 may be located between n-type region 141 and p-type region 142 in waveguide 106. It should be understood that borders between i-type region 143 and regions 141 and 142 may be vary.

Figure 4:
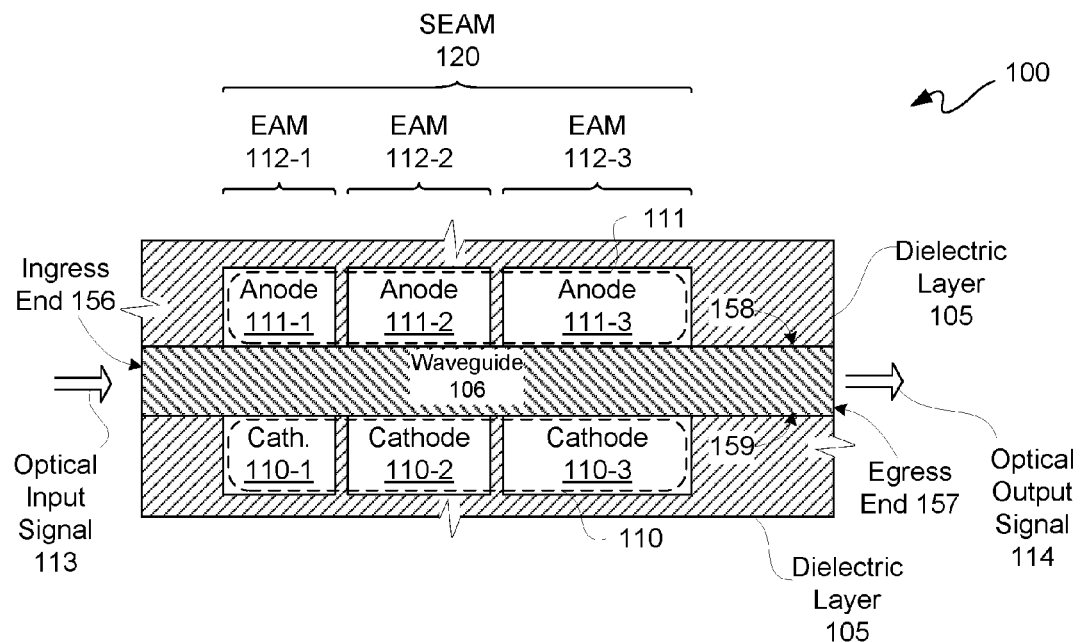
FIG. 4 is a block diagram of a top-down cross-sectional view illustratively depicting an exemplary SEAS.

FIG. 4 is a block diagram of a top-down cross-sectional view illustratively depicting an exemplary SEAS 100. Waveguide 106 may have an ingress end 156 configured for receiving an input optical signal 113 and an egress end 157 configured for outputting an output optical signal 114. SEAM 120 is a segmented SEAM 120 adjacent to waveguide 106. SEAM 120 includes a plurality of EAM segments, which in this example are EAM segments 112-1 through 112-3, adjacent to waveguide 106. Even though three EAM segments 112-1 through 112-3 are illustratively depicted, generally two or more EAM segments 112 may be implemented.

SEAM 120 may include a segmented anode 111 and a segmented cathode 110 respectively on opposite sidewalls of waveguide 106. Segmented anode 111 may have at least two anode segments located side-by-side lengthwise spaced apart from one another alongside a side 158 of waveguide 106, and segmented cathode 110 may have at least two cathode segments located side-by-side lengthwise spaced apart from one another alongside a side 159 of waveguide 106 opposite side 158. Anode segments 111-1 through 111-3 may be spaced across waveguide 106 from corresponding cathode segments 110-1 through 110-3 to form pairs to provide EAM segments 112-1 through 112-3, respectively. Generally, pairs of at least two anode segments 111 and at least two cathode segments 110 respectively aligned to one another for providing a series of at least two EAM segments 112 longitudinally alongside waveguide 106.

In this example, three EAM segments 112 are used for a pulse-amplitude modulation ("PAM") having four levels, namely PAM4 levels 0 to 3. However, in other implementations, other numbers of EAM segments 112 for other types of amplitude modulation may be used.

SEAM 120 may be readily used in many optical applications, such as optical links for example, where power consumption is important, as SEAM 120 is an energy-efficient device. For example, SEAM 120 may be used in optical backplanes. Moreover, SEAM 120 may be used in high-speed optical devices, such as optical transmitters and optical interconnects for example. Because SEAM 120 may modulate an optical signal (e.g., light) by electrically changing an absorption coefficient of an optically active material, such as a waveguide 106 formed of GeSi or other optically active material, SEAM 120 may compensate for nonlinearity in an electro-optical response, by having different segment lengths for example, which provides compensation for compatibility between optical and electrical PAM links or domains. Like conventional high-speed EAM modulators, SEAM 120 may be used with a non-return-to-zero ("NRZ") modulation.

In this example, length of EAM segment 112-1 is shorter than length of EAM segment 112-2, and length of EAM segment 112-2 is shorter than length of EAM segment 112-3. This progression from an input waveguide end 156 toward an output waveguide end 157 of longer and longer longitudinal lengths of anode and cathode segment pairs may be used to compensate for nonlinearity of each successive electro-optical response. Thus, by having EAM segments 112-1 through 112-3 vary in length, amplitude levels may become more distinct, namely more closely represent linear steps. SEAMs 120 may be formed for parallel optical signal processing on an SOI wafer 101 with each SEAM 120 having same or different nonlinearity compensation depending on application, such as for same or different types of modulation.

Again, it should be understood that SEAM 120 may be used without a high-speed electrical DAC, such as a modulator driver, to compensate for nonlinearity. Thus, for low-power applications, design challenges associated with designing a low-power high-speed DAC with high resolution may be avoided by using a SEAM 120. Moreover, by using a SEAM 120, design challenges of adaptively adjusting DAC codes to maintain a balanced PAM4 eye diagram may be avoided.

While same or different lengths of EAM segments 112 may be used for coarse nonlinearity compensation, thermal compensation may additionally be used with such same different lengths for fine nonlinearity adjustment. Thus, the amount of light allowed to pass as optical input signal 113 to optical output signal 114, namely the amount of light absorbed by electro-absorption, may be controlled by activating 0, 1, 2, or 3 of EAM segments 112-1 through 112-3. In this example, EAM segments 112-1 through 112-3 have different lengths for thermometer coding, with none, or one or more of EAM segments 112-1 through 112-3 being active at a time. However, in another implementation, a different type of coding, such as binary coding for example, may be used. Moreover, in another implementation, none or only one EAM segment 112 may be active at a time. Accordingly, it should be understood that many configurations may be implemented depending upon modulation and/or coding used.

Figures 1, 5:
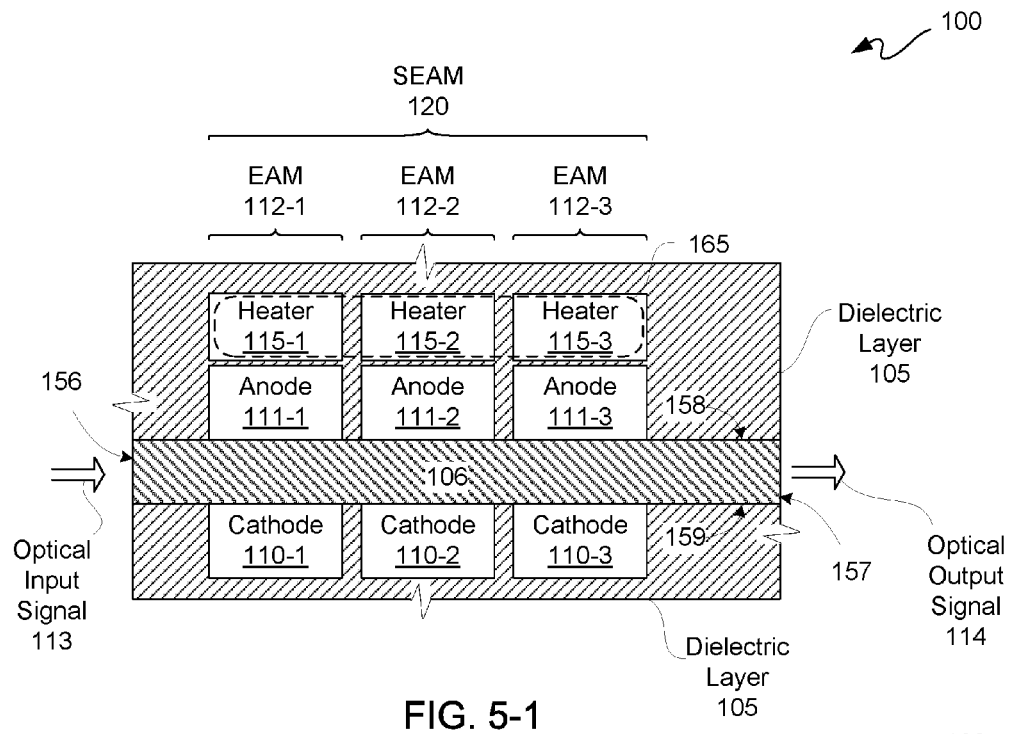
Figures 2, 5:
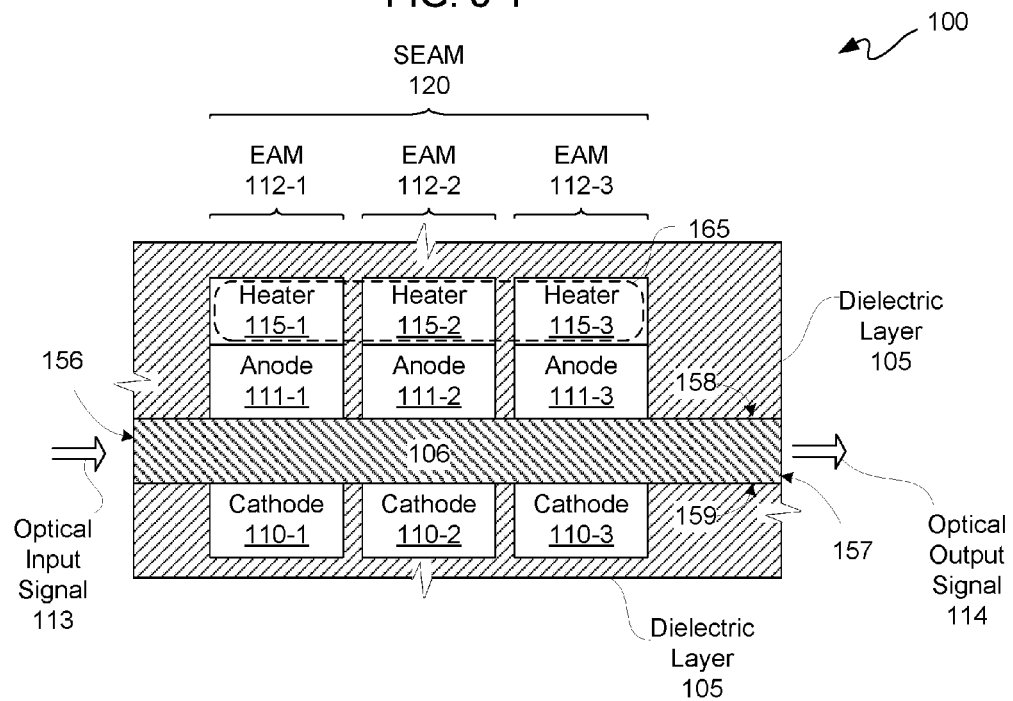
Figures 3, 5:
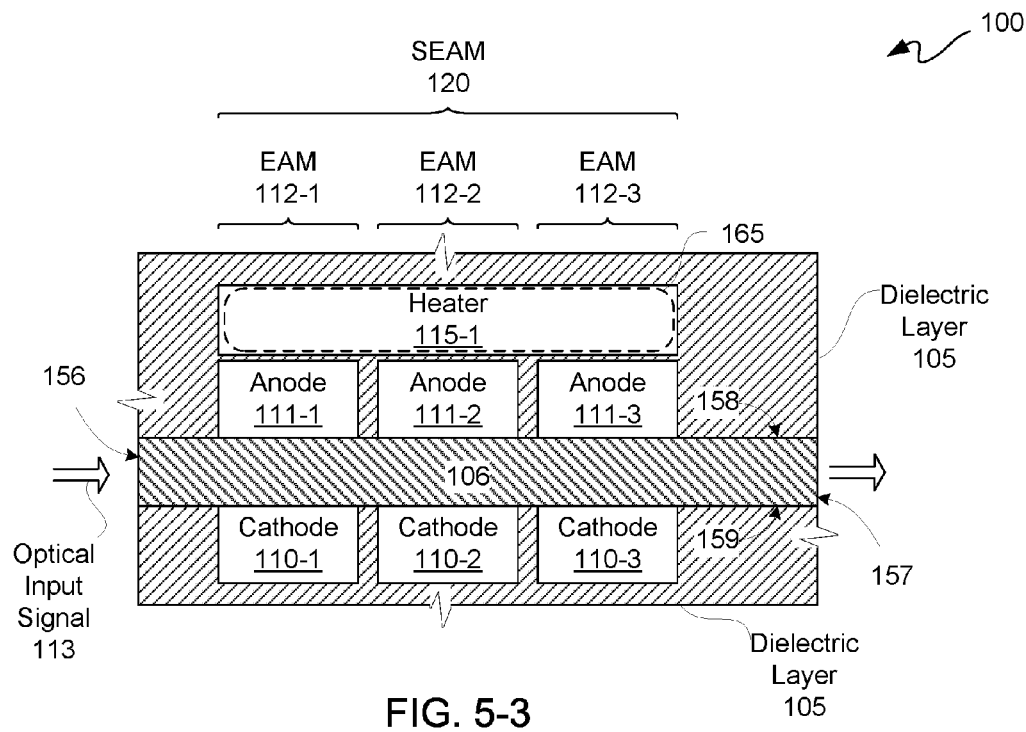
Figures 4, 5:
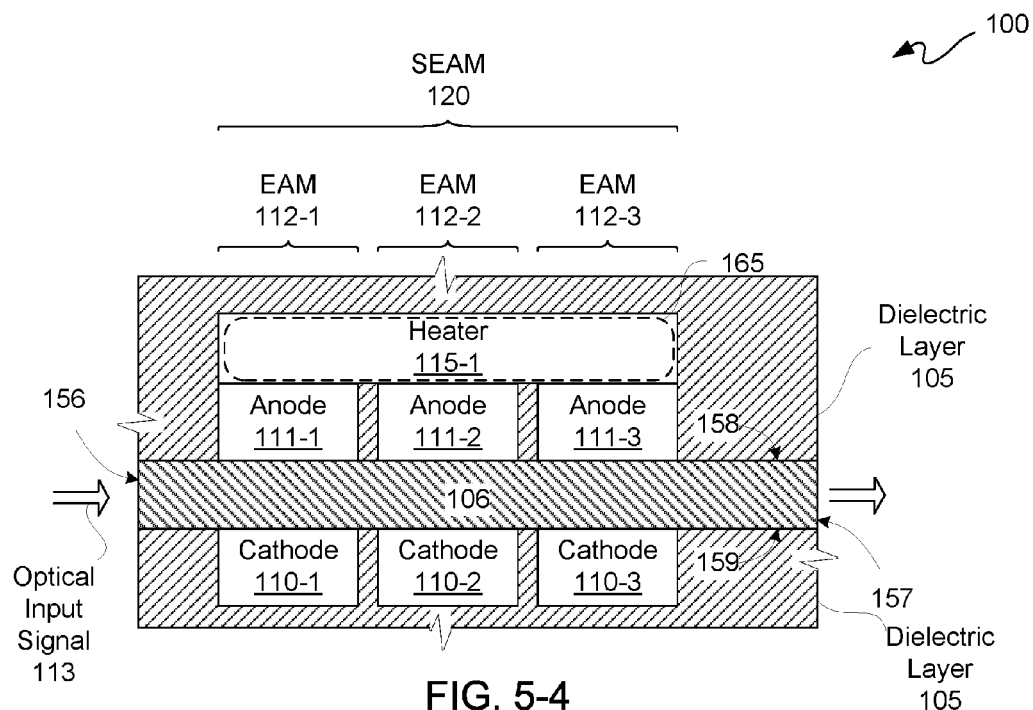

FIG. 5-1 is a block diagram of a top-down cross-sectional view illustratively depicting an exemplary SEAS 100 with an optional integrated heater 165. FIG. 5-1 is the same as FIG. 4, except for the addition of optional integrated heater 165, and so same description is not repeated for purposes of clarity and not limitation. Integrated heater 165 has at least two heater segments 115 located side-by-side lengthwise spaced apart from one another alongside and corresponding to at least two anode segments 111.

In this example, anode segments 111-1 through 111-3, cathode segments 110-1 through 110-3, and heater segments 115-1 through 115-3 may respectively be aligned to one another for providing a series of EAM segments 112-1 through 112-3. Again, even though a series of EAM segments 112-1 through 112-3 is illustratively depicted for a PAM4 implementation, in another implementation there may be at least two EAM segments 112. In this example, heater segments 115-1 through 115-3 are spaced apart from anode segments 111-1 through 111-3, respectively, where anode segments 111-1 through 111-3 are located between a side 158 of waveguide 106 and heater segments 115-1 through 115-3. Moreover, in this example, EAM segments 112 all have same lengths along waveguide 106.

FIG. 5-2 is a block diagram of a top-down cross-sectional view illustratively depicting an exemplary SEAS 100 with an optional integrated heater 165. FIG. 5-2 is the same as FIG. 5-1, except for optional integrated heater 165 is in contact with segmented anode 111, and so same description is not repeated for purposes of clarity and not limitation. In this example, anode segments 111-1 through 111-3 are respectively in contact with heater segments 115-1 through 115-3, where anode segments 111-1 through 111-3 are located between a side 158 of waveguide 106 and heater segments 115-1 through 115-3.

Even though heater segments 115-1 through 115-3 are located on an anode-side of waveguide 106, in another implementation heater segments 115-1 through 115-3 may be located on a cathode-side of waveguide 106 corresponding to cathode segments 110-1 through 110-3. In other words, an integrated heater 165 may have at least two heater segments 115 located side-by-side lengthwise spaced apart from one another, which integrated heater segments 115 may border or be spaced apart from at least two corresponding cathode segments along sides thereof. Again, such anode, cathode and heater segments may be respectively aligned to one another for providing a series of at least two electro-absorption modulation segments, such as EAM segments 112-1 through 112-3.

FIG. 5-3 is a block diagram of a top-down cross-sectional view illustratively depicting an exemplary SEAS 100 with an optional integrated heater 165. FIG. 5-3 is the same as FIG. 5-1, except for optional integrated heater 165 is has only one heater segment 115-1, namely an integrated non-lengthwise segmented heating element, and so same description is not repeated for purposes of clarity and not limitation. Integrated heater 165 in this example has one continuous heater segment 115-1 located alongside and spaced apart from at least two anode segments.

In this example, anode segments 111-1 through 111-3 and cathode segments 110-1 through 110-3 may respectively be aligned to one another, and one single heater segment 115-1 of integrated heater 165 may span all three anode segments for providing a series of EAM segments 112-1 through 112-3. In this example, integrated heater 165 is spaced apart from sides of anode segments 111-1 through 111-3, respectively, where anode segments 111-1 through 111-3 are located between a side 158 of waveguide 106 and integrated heater 165.

FIG. 5-4 is a block diagram of a top-down cross-sectional view illustratively depicting an exemplary SEAS 100 with an optional integrated heater 165. FIG. 5-4 is the same as FIG. 5-3, except for optional integrated heater 165 is in contact with anode segments 111, and so same description is not repeated for purposes of clarity and not limitation.

Even though a heater segment 115-1 of integrated heater 165 is located on an anode-side of waveguide 106, in another implementation integrated heater 165 may be located on a cathode-side of waveguide 106 proximate to or in contact with cathode segments 110-1 through 110-3. In other words, a heater segment 115-1 of integrated heater 165 may be located lengthwise spaced apart from or in contact with sides of at least two cathode segments. In an application where compensation for nonlinearity with respect to EAM segments 112 is sufficient exception for environmental temperature differences affecting each of such EAM segments 112, a less granular thermal adjustment of EAM segments 112 may be implemented, namely less granular than independently adjusting temperature of each EAM segment 112, and thus a single heater segment 115-1 may be used.

Figures 1, 6:
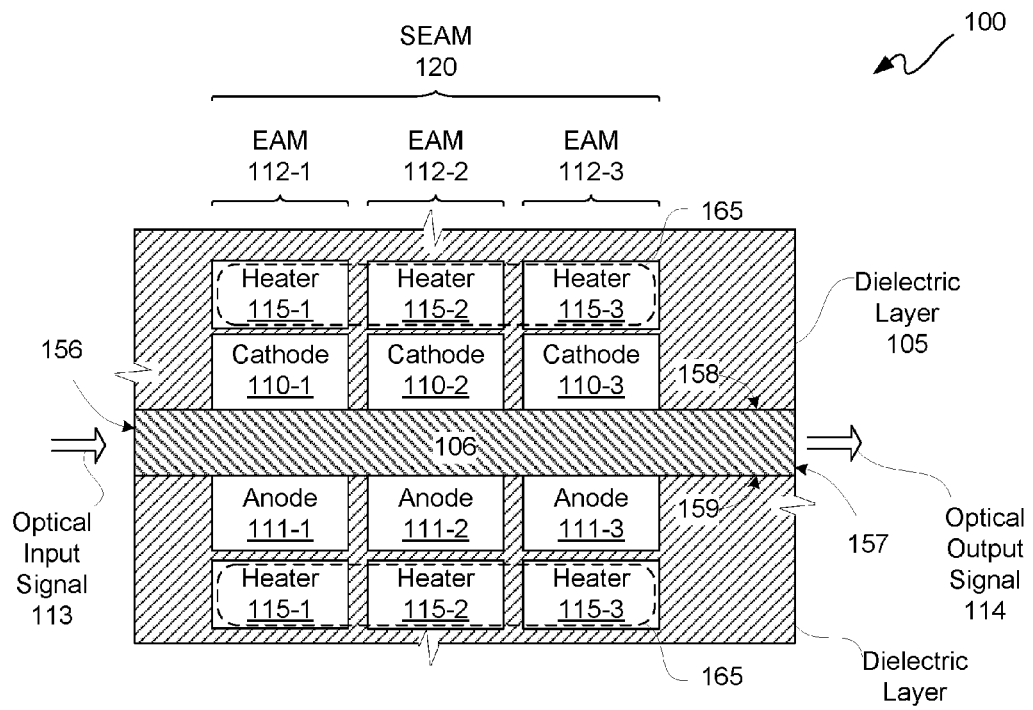
Figures 2, 6:
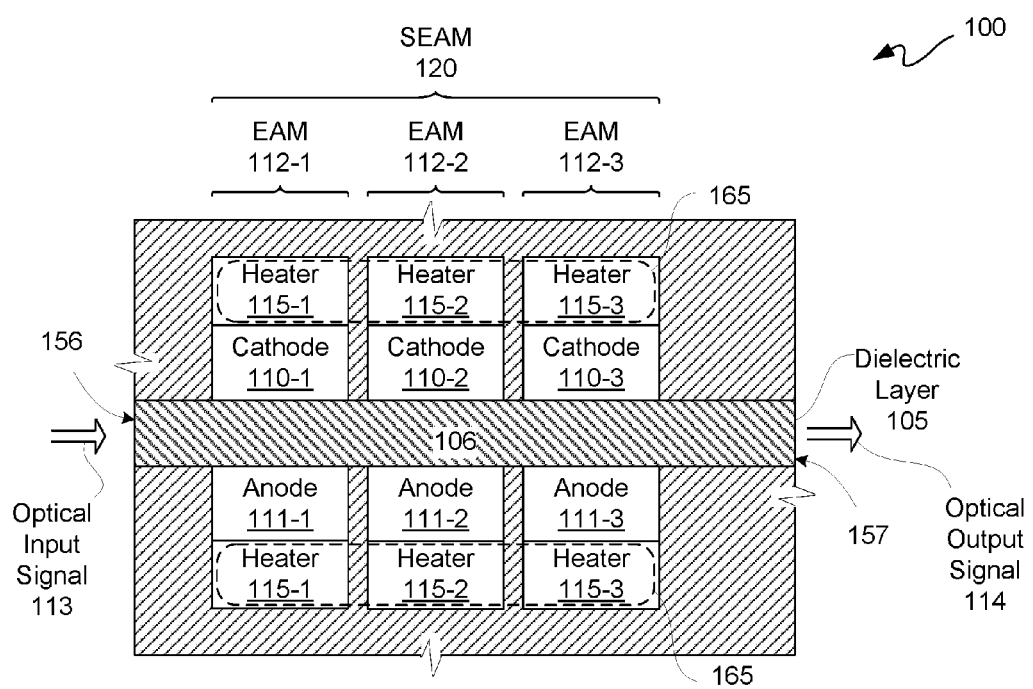
Figures 3, 6:
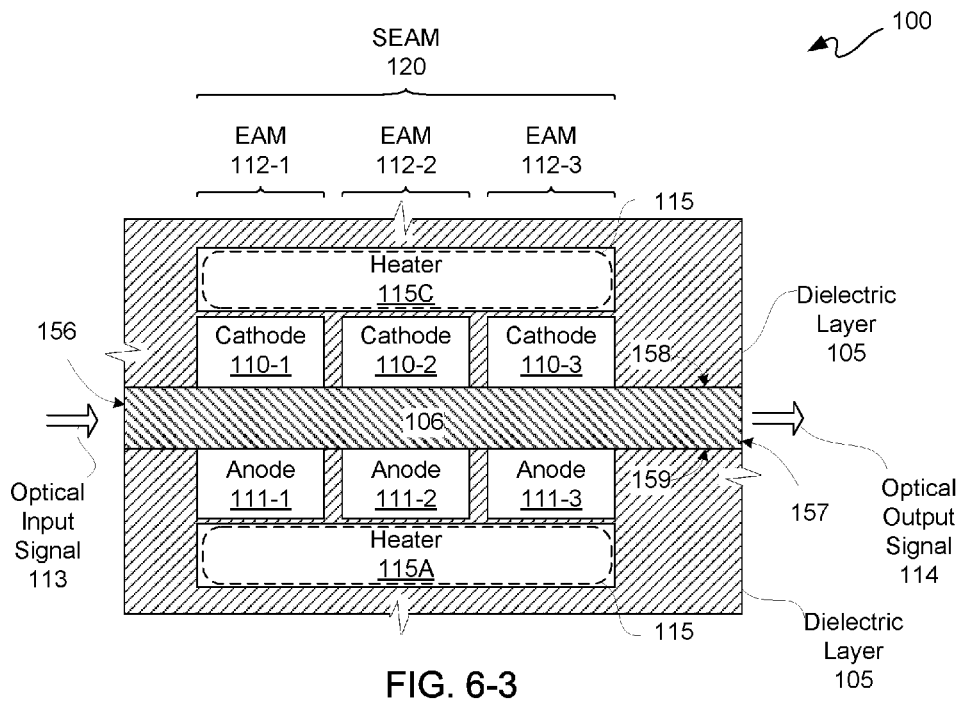
Figures 4, 6:
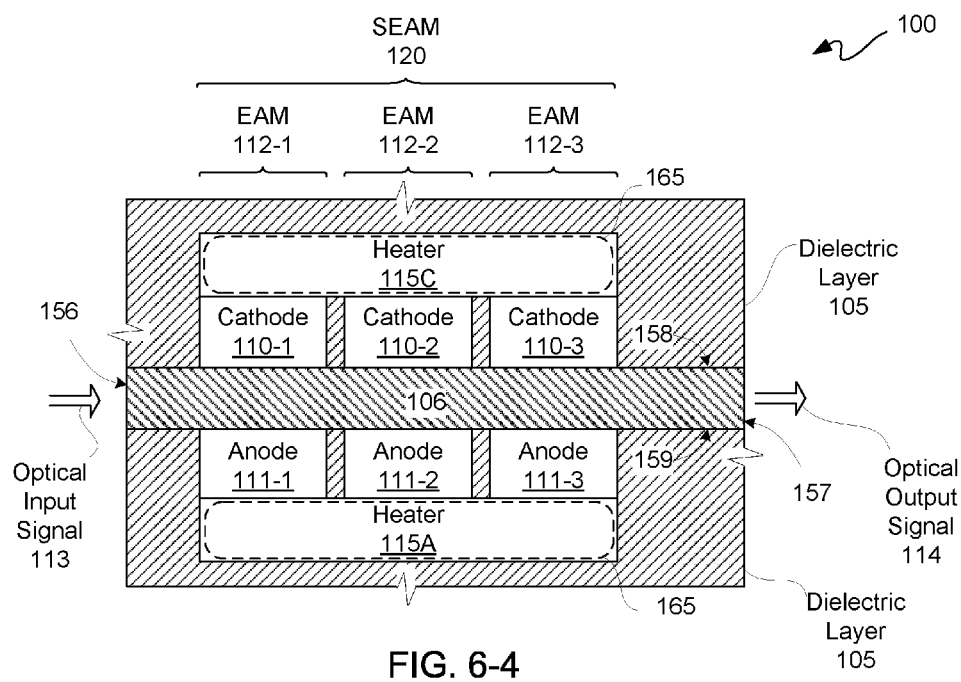

FIG. 6-1 is a block diagram of a top-down cross-sectional view illustratively depicting an exemplary SEAS 100 with an optional integrated heater 165. FIG. 6-1 is the same as FIG. 5-1, except for optional integrated heater 165 also on a cathode-side, and so same description is not repeated for purposes of clarity and not limitation.

Integrated heater 165 has at least two heater segments located side-by-side lengthwise spaced apart from one another alongside and corresponding to at least two anode and cathode segment pairs. In this example, anode segments 111-1 through 111-3 are respectively spaced apart from sides of heater segments 115-1 through 115-3, where anode segments 111-1 through 111-3 are located between a side 158 of waveguide 106 and heater segments 115-1 through 115-3. Moreover, heater segments 115-1 through 115-3 are spaced apart from sides of cathode segments 110-1 through 110-3, respectively, where cathode segments 110-1 through 110-3 are located between a side 159 of waveguide 106 and cathode-side heater segments 115-1 through 115-3.

In this example, anode-side and cathode-side heater segments 115-1 through 115-3 may be commonly controlled. For example, a heater segment 115-1, which may have both an anode-side and a cathode-side portion, may be independently controlled from heater segments 115-2 and 115-3. Moreover, in another implementation, an anode-side heater segment 115-1 may be independently controlled from a cathode-side heater segment 115-1, as well as independently controlled from other heater segments. Generally, an integrated heater 165 may have heater segments 115 located lengthwise alongside at least two anode segments 111-1 through 111-3 and/or at least two cathode segments 110-1 through 110-3 with or without contact thereof. Moreover, an integrated heater 165 may have at least two heater segments 115 located side-by-side one another with intervening dielectric gaps therebetween corresponding to at least two anode segments 111-1 through 111-3 or at least two cathode segments 110-1 through 110-3.

FIG. 6-2 is a block diagram of a top-down cross-sectional view illustratively depicting another exemplary SEAS 100 with an optional integrated heater 165. FIG. 6-2 is the same as FIG. 6-1, except for optional integrated heater 165 having heater segments 115-1 through 115-3 on both a cathode-side and an anode-side respectively in contact with cathode segments 110-1 through 110-3 and anode segments 111-1 through 111-3, and so same description is not repeated for purposes of clarity and not limitation. Thus, anode-side heater segments 115-1 through 115-3 are located side-by-side lengthwise spaced apart from one another and in contact with corresponding anode segments 111-1 through 111-3 along sides thereof, respectively, and cathode-side heater segments 115-1 through 115-3 are located side-by-side lengthwise spaced apart from one another and in contact with corresponding cathode segments 110-1 through 110-3 along sides thereof, respectively.

FIG. 6-3 is a block diagram of a top-down cross-sectional view illustratively depicting an exemplary SEAS 100 with an optional integrated heater 165. FIG. 6-3 is the same as FIG. 5-3, except for optional integrated heater 165 has a heating element on an anode-side and another heating element on a cathode-side each respectively spaced apart from anode and cathode segments, and so same description is not repeated for purposes of clarity and not limitation.

Integrated heater 165 has an anode-side continuous heater segment 115A located alongside and spaced apart from at least two anode segments, such as anode segments 111-1 through 111-3 for example, and has a cathode-side continuous heater segment 115C located alongside and spaced apart from at least two cathode segments, such as cathode segments 110-1 through 110-3 for example. In this example, anode segments 111-1 through 111-3 and cathode segments 110-1 through 110-3 may respectively be aligned to one another, and an anode-side heater segment 115A and a cathode-side heater segment 115C of integrated heater 165 may span all three anode and cathode segments, respectively, for providing a series of EAM segments 112-1 through 112-3. In this example, anode-side heater segment 115A is spaced apart from sides of anode segments 111-1 through 111-3, respectively, where anode segments 111-1 through 111-3 are located between a side 158 of waveguide 106 and anode-side heater segment 115A. Furthermore, in this example, cathode-side heater segment 115C is spaced apart from sides of cathode segments 110-1 through 110-3, respectively, where cathode segments 110-1 through 110-3 are located between a side 159 of waveguide 106 and cathode-side heater segment 115C.

FIG. 6-4 is a block diagram of a top-down cross-sectional view illustratively depicting an exemplary SEAS 100 with an optional integrated heater 165. FIG. 6-4 is the same as FIG. 6-3, except for optional integrated heater 165 has a heating element on an anode-side and another heating element on a cathode-side each respectively in contact with anode and cathode segments, and so same description is not repeated for purposes of clarity and not limitation. Anode-side heater segment 115A is located alongside and in contact with corresponding anode segments 111-1 through 111-3, respectively, and cathode-side heater segment 115C is located alongside and in contact with corresponding cathode segments 110-1 through 110-3.

In the example implementations of FIGS. 6-3 and 6-4, anode-side continuous heater segment 115A and cathode-side continuous heater segment 115C are commonly controlled. However, in another implementation, anode-side continuous heater segment 115A and cathode-side continuous heater segment 115C may be independently controlled.

For purposes of clarity by way of example and not limitation, it shall be assumed that a base configuration as illustratively depicted in FIG. 4 with corresponding integrated heater elements or segments 115 as in FIG. 5-1 is used in the following examples; however, it should be understood that any of the above examples, or combinations thereof, may be used in accordance with the following description. Moreover, it should be understood that multiple waveguides 106, and corresponding SEAMs 120, may be formed on an SOI wafer 101, even though only one is illustratively depicted for purposes of clarity.

Figure 7:
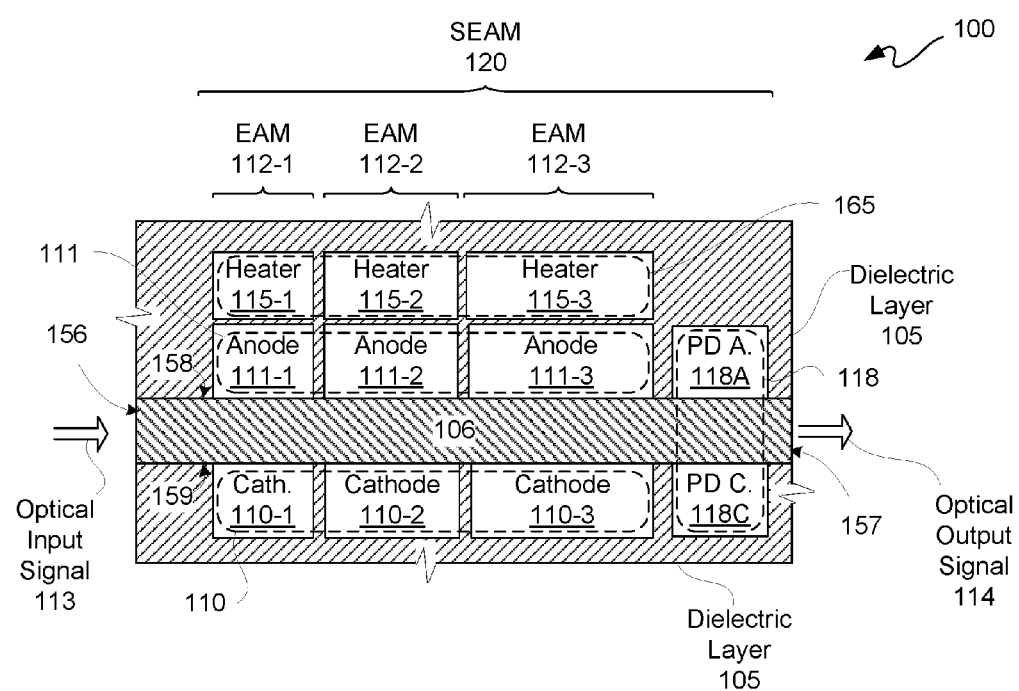
FIG. 7 is a block diagram of a top-down cross-sectional view illustratively depicting an exemplary SEAS with an optional integrated heater and a photo detector.

FIG. 7 is a block diagram of a top-down cross-sectional view illustratively depicting an exemplary SEAS 100 with an optional integrated heater 165. Even though EAM segments 112-1 through 112-3 have different lengths longitudinally alongside waveguide 106 as illustratively depicted, in another implementation lengths of two or more of EAM segments may be the same as one another longitudinally alongside waveguide 106. Longitudinal lengths may be different for different levels of electro-optical absorption, namely segmentally changing an absorption coefficient along waveguide 106 material. For example, EAM segments 112-1 through 112-3 may be configured with same or different lengths longitudinally alongside waveguide 106 corresponding to a thermometer code for an incremental progression of absorption states. However, in another example, EAM segments 112-1 through 112-3 be configured to have generally same or different lengths longitudinally alongside waveguide 106 corresponding to a binary code for a binary progression of absorption states.

In this implementation, a photodetector 118 is located proximate to egress end 157 and forms part of SEAM 120. Photodetector 118 may include a detector anode 118A located alongside side 158 of waveguide 106 and a detector cathode 118C located alongside side 159 of waveguide 106. Detector anode 118A and detector cathode 118C may be aligned to one another on opposing sides of waveguide 106 and adjacent to sides 158 and 159, respectively. Detector anode 118A and detector cathode 118C may be formed along with anode segments 111 and cathode segments 110, as the same material may be used for all of these anodes and cathodes.

Detector anode 118A and detector cathode 118C may be spaced apart from a last stage, namely an nth stage, anode segment 111-$n$ and a last stage cathode segment 110-$n$, respectively, of a series of n EAM segments 112-1 through 112-$n$. Photodetector 118 may be configured to provide a photocurrent signal proportional to detected intensity of output optical signal 114 for association with a data eye of such output optical signal 114. Anode segments 111-1 through 111-3 may collectively form a segmented anode 111 of an SEAM 120, and cathode segments 110-1 through 110-3 may collectively form a segmented cathode 110. However, a cathode may be non-segmented, namely a unitary cathode segment 110, for being paired with a segmented anode 111. Along those lines, this has to do with having a segmented or non-segmented cathode 110 being commonly grounded or otherwise commonly coupled, whereas anode segments of a segmented anode 111 are electrically separated from one another.

Figure 8:
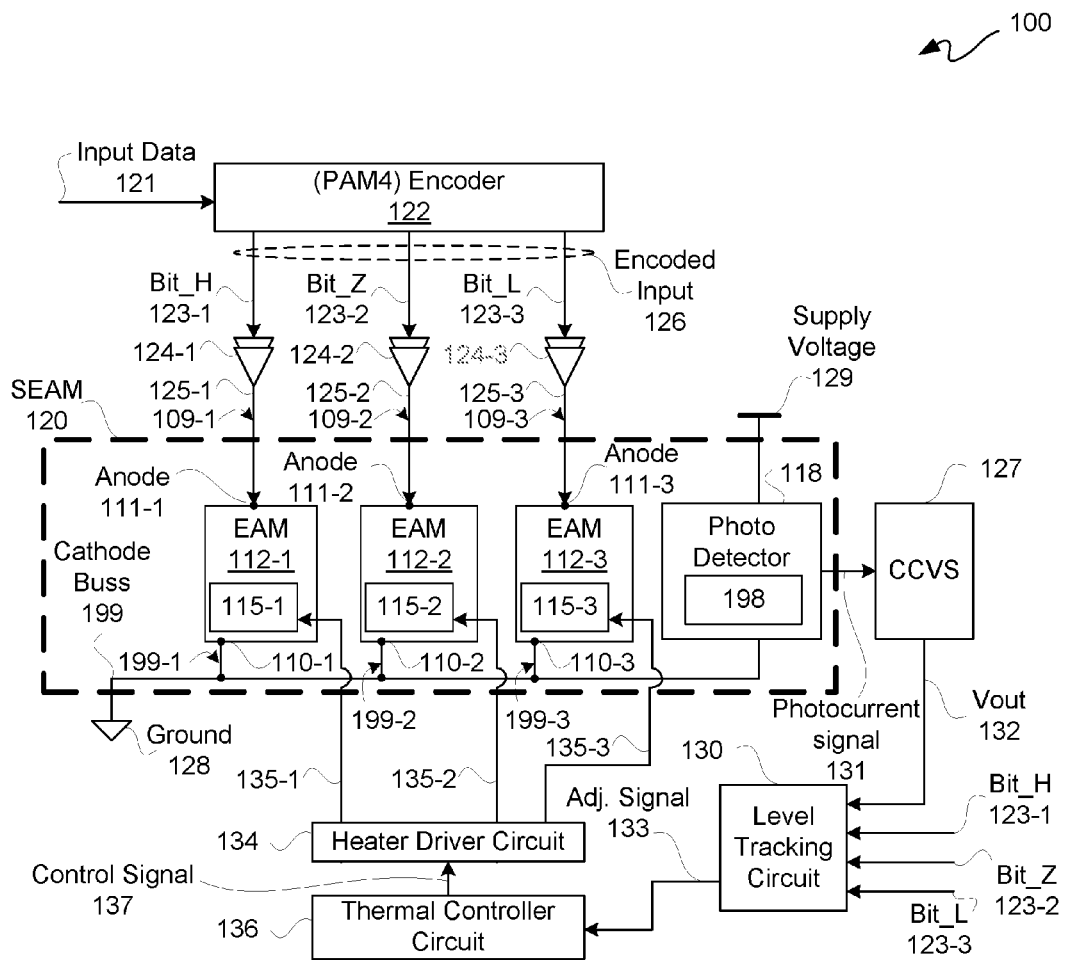
FIG. 8 is a schematic diagram illustratively depicting an exemplary SEAS for a transmitter for an electrical domain.

FIG. 8 is a schematic diagram illustratively depicting an exemplary SEAS 100 for a transmitter for an electrical domain. FIG. 8 is further described with simultaneous reference to FIGS. 1 through 8.

Input data 121 is provided to an encoder 122. In this example, encoder 122 is a PAM4 encoder; however, in another implementation another type of modulation, including without limitation another type of PAM, may be used to encode input data 121 with an encoder. In this example for PAM4, a "high" bit ("Bit_H") drive signal 123-1, a "zero" bit ("Bit_Z") drive signal 123-2, a "low" bit ("Bit_L") drive signal 123-3, or a combination of these drive signals may be active at a time or none of these drive signals may be active at a time in response to output from encoder 122, which output is responsive to input data 121.

In PAM4, four distinct pulse amplitude levels or pulse amplitudes, generally amplitude levels 1, 2, 3, and 4, are represented by two bits each, such as for example 00, 01, 11, and 10 for a Gray code implementation. Each pair of PAM4 bits is called a "symbol", namely two bits per symbol. When one of such four amplitude levels is transmitted in a symbol period, two bits are transmitted in parallel. For a PAM4 data stream with 2-bits per symbol, each two bits of input data 121 may be encoded into a 3-bit thermometer code for this example. Table I below is an example a modulation code that may be used for encoding of input data 121 for this implementation, namely for mapping 2-bit PAM4 symbols of input data 121 into corresponding 3-bit thermometer drive signals represented with states of bits of drive signals 123-1 through 123-3.

TABLE I

| PAM4 input data 121 | Bit_H | Bit_Z | Bit_L |
|---|---|---|---|
| 11 | 1 | 1 | 1 |
| 10 | 0 | 1 | 1 |
| 01 | 0 | 0 | 1 |
| 00 | 0 | 0 | 0 |

In this example, an encoded input 126 to SEAM 120 as output from encoder 122 has a greatest amount of controlled electro-optical absorption responsive to a PAM4 11 symbol input of input data 121 resulting in all of bits of drive signals 123-1 through 123-3 being asserted, namely in this example all logic 1s. In this example, an encoded input 126 to SEAM 120 as output from encoder 122 has a least amount of absorption responsive to a PAM4 00 symbol input of input data 121 resulting in none of bits of drive signals 123-1 through 123-3 being asserted, namely in this example all logic 0s. In this example, an encoded input 126 to SEAM 120 as output from encoder 122 has a second least amount of absorption responsive to a PAM4 01 symbol input of input data 121 resulting in none of bits of drive signals 123-1 and 123-2 being asserted, namely in this example both logic 0s, and a bit of drive signal 123-3 being asserted, namely in this example a logic 1. In this example, an encoded input 126 to SEAM 120 as output from encoder 122 has a second most amount of absorption responsive to a PAM4 10 symbol input of input data 121 resulting in both of bits of drive signals 123-2 and 123-3 being asserted, namely in this example both logic 1s, and a bit of drive signal 123-1 not being asserted, namely in this example a logic 0. However, any encoding may be used, including without limitation a complete reversal of the encoding of Table I, a Gray code version of Table I, or another combination. Generally, various steps in light may be controlled by electro-absorption to provide detectable amplitude levels, whether thermometer, binary, or otherwise encoded.

Therefore, for purposes of clarity by way of example and not limitation, it shall be assumed that the encoding of Table I is used. Moreover, even though a 100% duty cycle is assumed for processing input data 121 for modulating an optical input signal 113, such as a carrier signal for example, responsive to such input data 121 provided as encoded input 126 to SEAM 120, in another implementation less than a 100% duty cycle may be used, namely with null periods between symbol periods. Along those lines, for this implementation, a null period or interval may be used between data bursts, and so all of bits of drive signals 123 may be held at logic 0s for such null periods or intervals.

In this exemplary implementation, three drive signals 123 drive EAM segments 112-1 through 112-3, respectively. A ratio between EAM segments 112-1 through 112-3 may be selected such that nonlinearity in an electro-optical response can be compensated for in a PAM4 eye. In this example, each EAM segment 112-1 through 112-3 is driven by a corresponding NRZ voltage-mode driver 124-1 through 124-3, which are respectively coupled to receive drive signals 123-1 through 123-3. Implementation of NRZ voltage mode drivers 124-1 through 124-3 is significantly less complex and uses less power than a high-speed DAC.

NRZ voltage outputs 125-1 through 125-3 respectively of NRZ voltage mode drivers 124-1 through 124-3 responsive to corresponding drive signals 123-1 through 123-3 may provide NRZ voltages to anode segments 111-1 through 111-3, respectively. Thus, anode segments 111-1 through 111-3 respectively of EAM segments 112-1 through 112-3 may receive a corresponding NRZ voltage of NRZ voltage outputs 125-1 through 125-3 via anode signal busses 109-1 through 109-3, respectively. Though NRZ voltages are used, other types of voltages may be used, such as a non-NRZ voltage or an inverted NRZ ("NRZI") voltage for example.

NRZ voltages may respectively be applied to anodes 111-1 through 111-3 for conducting respective electric fields to corresponding cathode segments 110-1 through 110-3 through corresponding portions of waveguide 106. At least two anode segments 111 may be respectively electrically coupled to separate source nodes, such as output nodes of NRZ voltage mode drivers 124-1 through 124-3 respectively. This may be used for selectively applying voltages to such to anode segments 111-1 through 111-3, respectively, from NRZ voltage mode drivers 124-1 through 124-3. Any and all asserted bits of an encoded input 126 may be used to modulate input optical signal 113 by electro-optical modulation thereof to provide a modulated output optical signal 114, where such modulation effectively represents a modulation code of an encoded input 126.

Cathode segments 110-1 through 110-3 respectively corresponding to anode segments 111-1 through 111-3 may all be coupled to a common ground 128 through corresponding cathode signal busses 199-1 through 199-3. Cathode signal busses 199-1 through 199-3 may be a common cathode buss 199 coupled to ground 128. Thus, in another implementation, rather than cathode segments 110-1 through 110-3, a single non-segmented cathode 110 may be used for having corresponding surface areas facing surface areas of anode segments 111-1 through 111-3 across waveguide 106.

After being modulated, if at all, by SEAM 120, optical input signal 113 may pass through waveguide 106 proximate to photodetector 118, namely between photodetector anode 118A and cathode 118C, of SEAM 120. Photodetector 118 may include a photodiode circuit 198 having a photodiode, where such photodetector circuit 198 may be conventional, and thus is not described in unnecessary detail for purposes of clarity and not limitation. For adaptive thermal tuning in this example, a photodiode for PAM4 level detection may be implemented near a bus egress end 157 of waveguide 106, namely along waveguide 106 after SEAM 120.

Photodetector 118, which may be biased between a photodetector supply voltage 129 and ground 128, may output a photocurrent signal 131 responsive to detected photons, namely detected intensity, of optical output signal 114 passing through. In an implementation, optical input signal 113 may be a laser beam, such as from a laser diode for example, and EAS 100 may be in a photonic integrated circuit. Photocurrent signal 131 output from photodetector 118 may represent a data eye of optical output signal 114 associated with a PAM thereof, which in this example generally is a data eye having four distinct pulse amplitude levels. However, in another implementation, such data eye may have fewer or more than four distinct pulse amplitude levels.

A current-controlled voltage source ("CCVS") 127 may be configured to receive photocurrent signal 131 to provide an output voltage signal ("Vout") 132. CCVS 127 may be a circuit implemented for example with a transimpedance amplifier ("TIA"). A level tracking circuit 130 may be configured to receive output voltage signal 132 to provide an eye opening adjustment signal 133. Level tracking circuit 130 may be configured for optical modulation amplitude ("OMA") tracking in order to know what modulating states to look for in an eye opening of an optical output signal 114, level tracking circuit 130 may be configured to receive drive signals 123-1 through 123-3. Level tracking circuit 130 may be configured responsive to states of drive signals 123-1 through 123-3 and a corresponding output voltage signal 132 to determine whether linearity of an eye opening with respect to any one or more amplitude levels thereof is to be adjusted to enhance any one or more corresponding amplitude level's linearity.

A thermal controller 136 may be configured to receive eye opening adjustment signal 133 to provide a thermal control signal 137. Thermal control signal 137 may be an N-bit coded signal. A heater driver 134 may be configured to receive thermal control signal 137 to assert none or one or more of heater activation signals 135-1 through 135-3 respectively to heater segments 115-1 through 115-3.

Absorption curves of EAM segments 112-1 through 112-3 for waveguide 106 each have a temperature dependent variable component. Along those lines, in this example three separate heater segments 115-1 through 115-3, which may be thought of as heating elements, are driven by heater driver circuit 134 of an integrated heater 165. In this example, it shall be assumed that heater segments 115-1 through 115-3 include both anode-side heating elements and cathode-side heating elements corresponding to one another. Although heater segments 115-1 through 115-3 are commonly coupled to heater driver 134, each anode-side and cathode-side heating element may be separately controlled. However, in another implementation, pairs of anode-cathode-side of heating elements may not be commonly coupled to receive a corresponding heater activation signal but may be independently controlled with respect to one another.

Heater activation signals 135-1 through 135-3 respectively provided to heating segments 115-1 through 115-3 may be used to independently tune EAM segments 112-1 through 112-3 to different or same temperatures. In this implementation, control signal 137 may indicate to heater driver circuit 134 which of heating segments 115-1 through 115-3 is to be turned on or off to perform an adaptive adjustment for fine tuning of linearity of optical PAM4 amplitude levels.

Providing flexibility in compensating for both process variations through sizing of EAM segments 112 and temperature fluctuations through control of integrated heating segments 115 facilitates enhancing linearity of SEAM 120. An integrated heater 165 may be used to adjust temperature of heating segments 115-1 through 115-3 independently of one another through thermal controller circuit 136 and heater driver circuit 134, where heater driver circuit 134 has three separate drivers corresponding to heater segments 115-1 through 115-3. Thus, in addition to compensating for nonlinearity of SEAM 120 for optical PAM4 transmission without a having to have a DAC for such compensation, an integrated photodiode and separate heating elements may be used for adaptive thermal tuning for PAM4 modulation.

Figure 9:
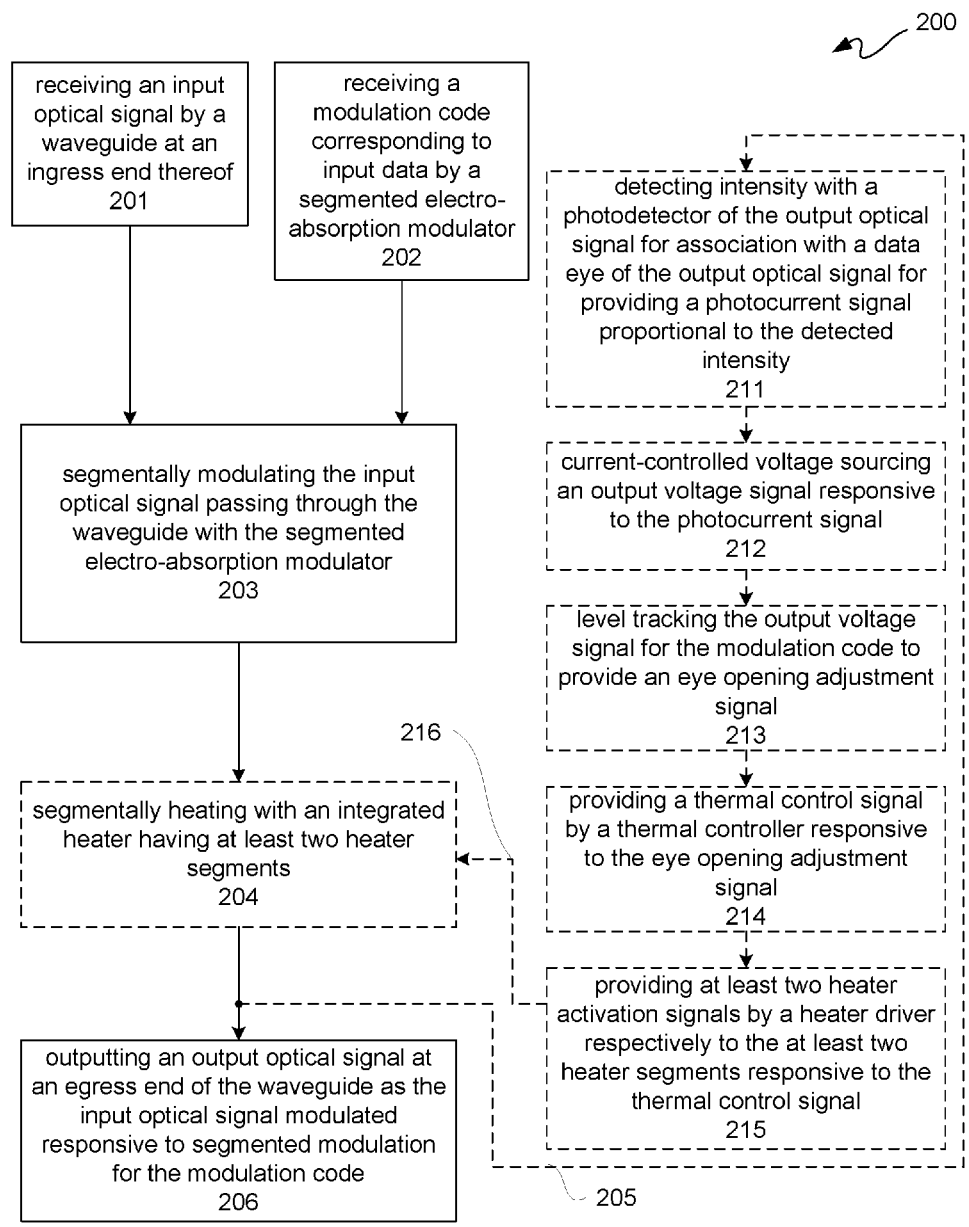
FIG. 9 is a flow diagram illustratively depicting an exemplary segmented electro-absorption modulation process.

FIG. 9 is a flow diagram illustratively depicting an exemplary segmented electro-absorption modulation process 200. FIG. 9 is further described with simultaneous reference to FIGS. 1 through 9.

At 201, an input optical signal 113 may be received by a waveguide 106 at an ingress end 156. At 202, generally at about the same time input optical signal 113 is received, a modulation code of encoded input 126 corresponding to input data 121 may be received by a SEAM 120.

At 203, input optical signal 113 may be segmentally modulated by SEAM 120 as such light signal passes through a corresponding portion of waveguide 106 with SEAM 120 adjacent to waveguide 106. Optionally, at 204, an integrated heater 165 having at least two heater segments 115 may be used for segmentally heating corresponding anode segments 111 and/or cathode segments 115-10, as previously described. Segmentally modulating at 203 may thus be performed with a SEAM 120 including anode, cathode and optional heater segments respectively aligned to one another to provide serial segmented modulation by at least two electro-absorption modulation segments 112 of SEAM 120. At 206, an output optical signal 114 may be output at an egress end 157 of waveguide 106 as input optical signal 113 modulated responsive to segmented modulation for such modulation code.

If, an optional segmented heating is used at 204, operations 211 through 215 may be used. Along those lines, as indicated by dashed line 205, an output optical signal 114 may be obtained and intensity thereof may be detected at 211 with a photodetector 118 of an output optical signal 114 prior to output at 206 for association with a data eye of such output optical signal 114 for providing a photocurrent signal 131 proportional to detected intensity. Photocurrent signal 131 for a data eye may be associated with a PAM having four or more distinct pulse amplitude levels.

At 212, current-controlled voltage sourcing of such an output voltage signal 114 may be performed responsive to photocurrent signal 131 using a TIA. At 213, level tracking of output voltage signal 114 for a modulation code may be performed to provide an eye opening adjustment signal 133 using level tracking circuit 130. At 214, a thermal control signal may be provided by a thermal controller circuit 136 responsive to such eye opening adjustment signal 133. At 215, least two heater activation signals 135 may be provided by a heater driver circuit 134 respectively to at least two heater segments 115, as generally indicated by dashed line 216, responsive to thermal control signal 137 for segmentally heating at 204.

Figures 1, 10:
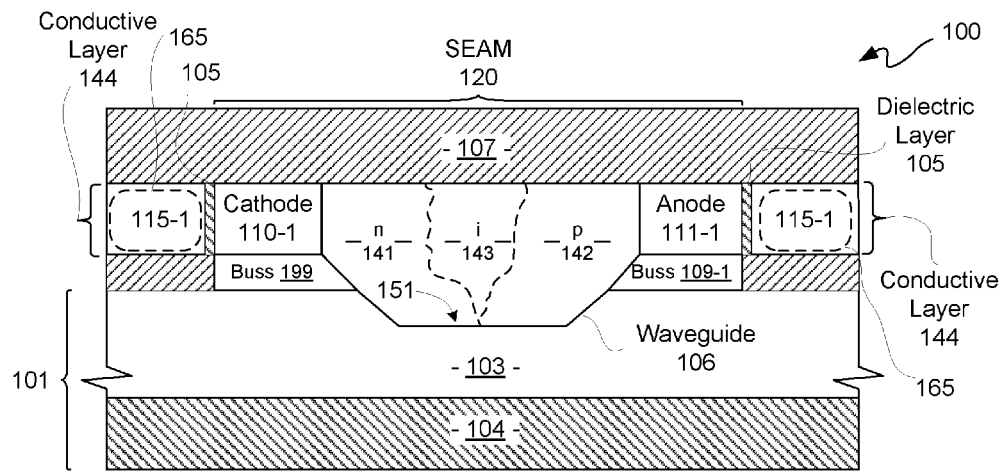
Figures 2, 10:
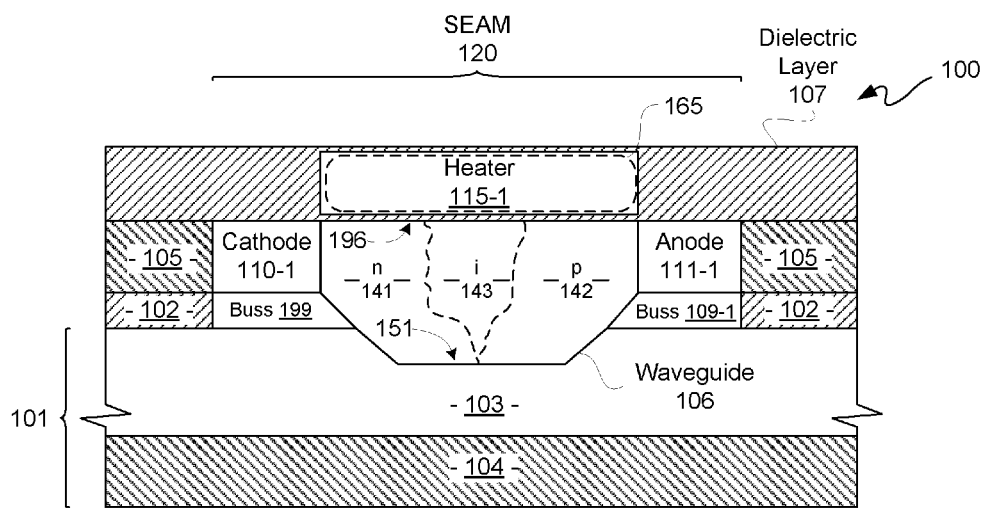
Figures 3, 10:
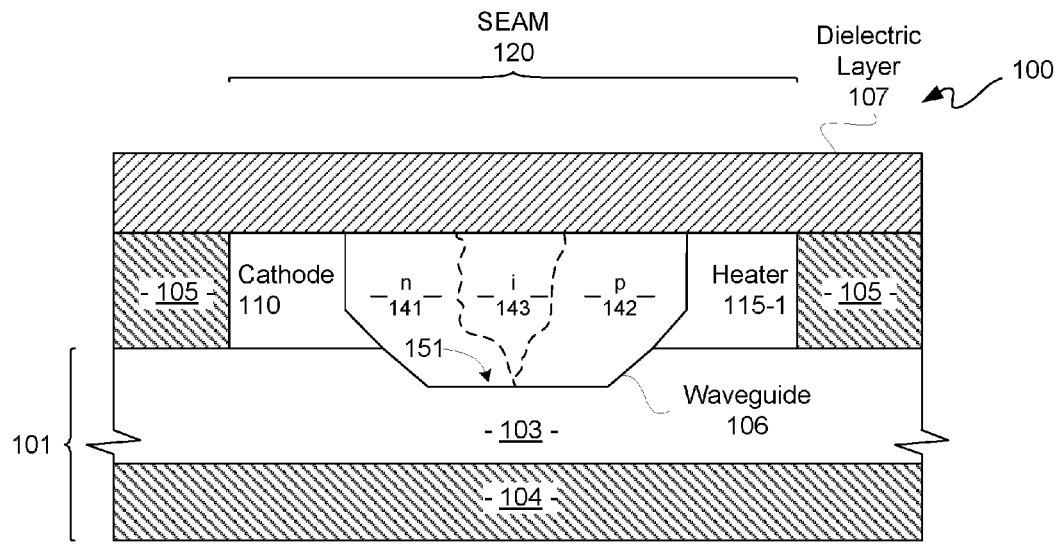

FIGS. 10-1 through 10-3 are respective block diagrams illustratively depicting end cross-sectional views of respective exemplary SEASs 100 each having a SEAM 120 with an optional integrated heater 165. FIGS. 10-1 and 10-2 are further described with simultaneous reference to FIGS. 1 through 9, where generally same description is not repeated for purposes of clarity and not limitation.

FIG. 10-1 is an exemplary cross-sectional view on end of a SEAS 100 of FIG. 6-1. As previously described, heater segments 115-1 may be respectively alongside a corresponding anode segment 111-1 and a corresponding cathode segment 110-1. In this implementation, conductive layer 144, which may be a metal layer, is used to form heater segments 115, as well as anode segments 111 and cathode segments 111, all in a same deposition operation, where a gap provided with dielectric layer 105 is used to provide electric isolation between heater segments 115 and corresponding anode and cathode segments. However, in another implementation, separate depositions may be used by masking. Rather than one or more metal layers used to form heating elements for heater segments 115 in a silicon photonics ("SiPh") implementation, in another implementation heater segments 115 may be formed using doped or undoped polycrystalline silicon ("poly"), such as poly resistors for example.

Having thermally conductive electrodes, such as metal electrodes provided as anode segments 110 and/or cathode segments 111, between one or more heater segments 115 and waveguide 106 may degrade efficiency of heater 165. In another implementation, heater segments 115 may directly overlap or be alongside waveguide 106 with or without direct contact with waveguide 106 and without intervening anode and/or cathode segments.

Along those lines, in FIG. 10-2, heater segment 115-1 is positioned over and above waveguide 106. Heater segment 115-1 of heater 165 may be spaced apart from an upper surface 196 of waveguide 106, such as by a portion of dielectric layer 107. However, in another implementation, heater segment 115-1 may be in direct contact with an upper surface 196 of waveguide 106. In either implementation, heater segment 115-1 overlaps an upper surface 196 of waveguide 106. A via or hole for heater segment 115-1 may be defined in dielectric layer 107 followed by deposition of a resistive and/or conductive material for providing a heating element. By having heater segment 115-1 overlap, as well as optionally completely span a width of waveguide 106, tuning efficiency of heater 165 may be enhanced.

Figures 1, 11:
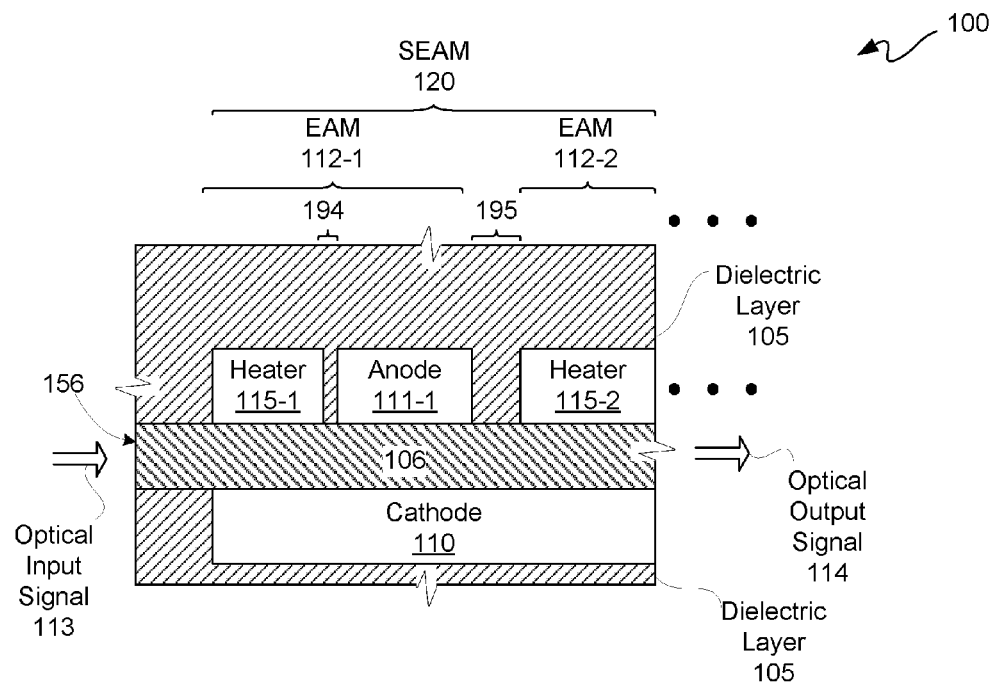
Figures 2, 11:
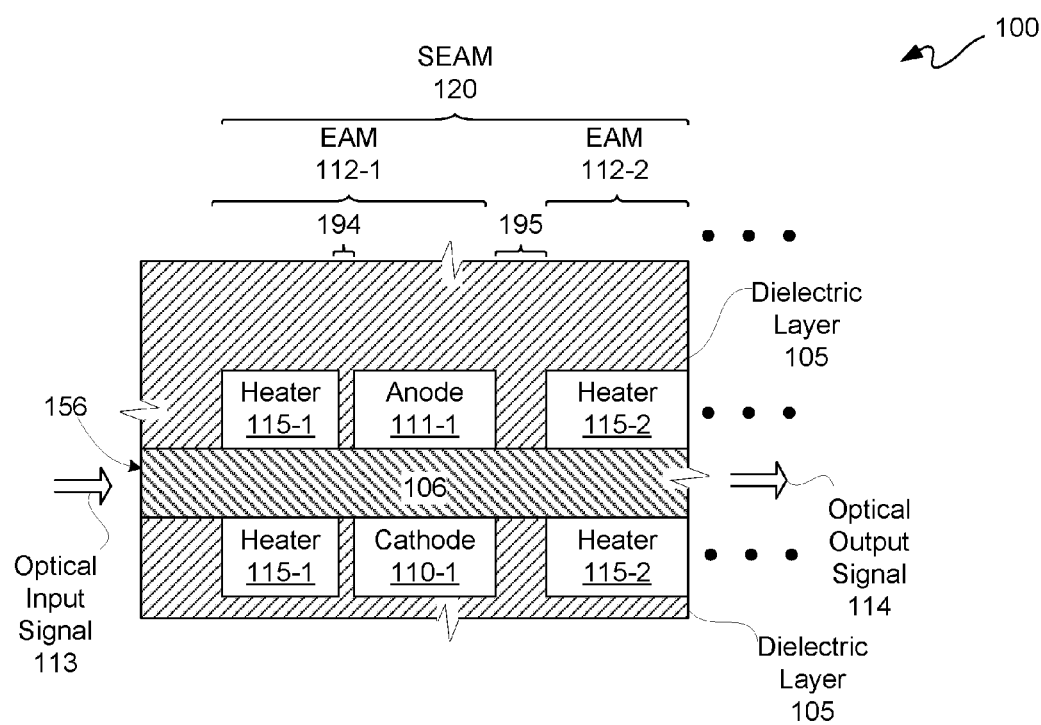

FIGS. 11-1 and 11-2 are respective block diagrams of top-down cross-sectional views illustratively depicting respective exemplary SEASs 100 each with an optional integrated heater 165 such as for SEAS 100 of FIG. 10-3. FIGS. 10-3, 11-2 and 11-2 are further described with simultaneous reference to FIGS. 1 through 11-2.

With reference to FIGS. 10-3 and 11-1, a unitary cathode 110 is formed in a via defined in dielectric layer 105 from a top surface thereof down to an upper surface of silicon layer 103 and lengthwise bordering a side portion of waveguide 106. At the same time a unitary cathode 110 via is formed, vias may be formed for anode segments 111 and heater segments 115. Moreover, rather than a unitary cathode 110, a segmented cathode may be formed as previously described and as illustratively depicted in FIG. 11-2.

Heater segments 115 may be interleaved with anode segments 111 on an anode side of waveguide 106. In an implementation with a segmented cathode as in FIG. 11-2, heater segments 115 may be interleaved with cathode segments 110 on a cathode side of waveguide 106. Moreover, for an implementation with a segmented anode and a segmented cathode, a set of heater segments 115 may be interleaved with anode segments 111, and another set of heater segments 115 may be interleaved with cathode segments 110. Cathode segments 110 and corresponding anode segments 111 may be latitudinally aligned to one another on opposing sides of waveguide 106, and heater segments 115 may be latitudinally aligned to one another with an intervening waveguide 106 between such aligned heater segments. In this implementation, anode segments 111 and corresponding heater segments 115 are in contact with a side of waveguide 106, and cathode segments 110 and corresponding heater segments 115 are in contact with an opposite side of waveguide 106. As these and other configurations follow from the description herein, such various configurations are not described in unnecessary detail for purposes of clarity and not limitation.

Generally heater segments 115 may be interleaved as spaced apart from corresponding anode and/or cathode electrodes, where such spacing may be provided by one or more dielectric layers for electrical isolation between neighboring segments. EAM segments 112 may each include a heater segment 115 and a corresponding electrode segment, which in this example for EAM segment 112-1 includes a heater segment 115-1 and an anode segment 111-1. A lengthwise gap 194 between a heater segment 115-1 and an anode segment 111-1 of an EAM segment 112-1 for example may be shorter than a lengthwise gap 195 between immediately neighboring EAM segments 112, such as for example EAM segment 112-1 and partial EAM segment 112-2. This separation may be for more individualized EAM and/or thermal control on an EAM segment-by-segment basis. In other words, a wider lengthwise gap reduces effects of electric field EAM and/or thermal overlap between neighboring EAM segments 112.

Figure 12:
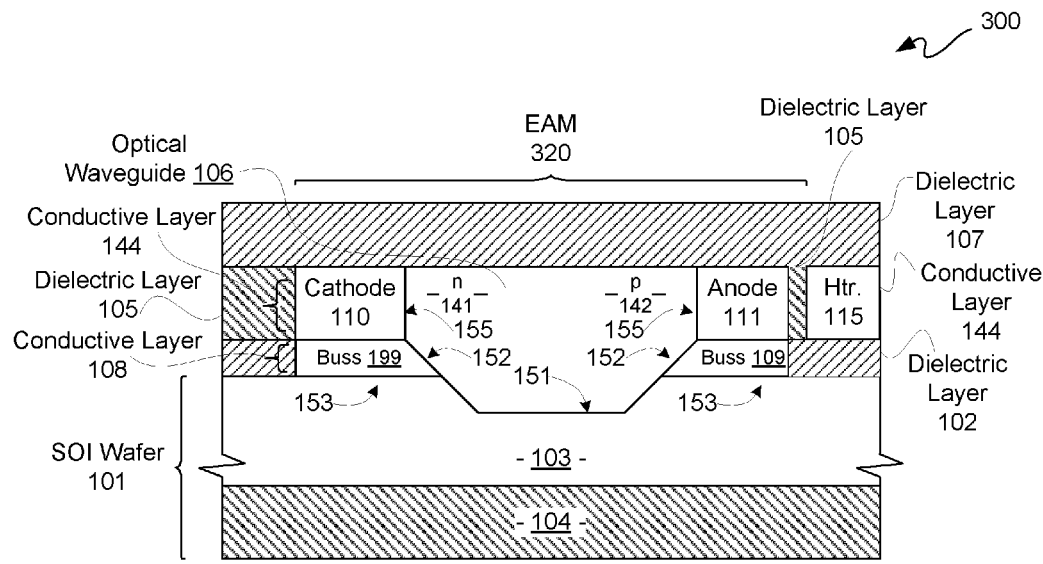
FIG. 12 is a block diagram illustratively depicting an end cross-sectional view of an exemplary electro-absorption system ("EAS") having an exemplary electro-absorption modulator ("EAM").

FIG. 12 is a block diagram illustratively depicting an end-on cross-sectional view of an exemplary electro-absorption system ("EAS") 300 having an electro-absorption modulator ("EAM") 320. EAS 300 may include more than one EAM 320, though only one EAM 320 is illustratively depicted for purposes of clarity and not limitation. In an implementation, EAM 320 may be replaced with a SEAM 120. Even though a SEAM 120 may be used in accordance with the description herein, for purposes of clarity and not limitation, the following description is in terms of a non-segmented EAM 320 of a non-segmented EAS 300, unless otherwise expressly described below. However, it should be understood that an EAM 320 may be used interchangeably with a SEAM 120 for the purposes of the following description.

In this implementation, a dielectric layer 102 may be formed over upper surface 153 and patterned for defining locations for conductive layer 108 to provide signal busses 109 and 199, including contacts therefor. In the above or another implementation, a silicon layer 103 may be implanted, diffused and/or otherwise impregnated with same or different types of dopants for forming signal busses 109 and 199.

Another dielectric layer 105 may be formed over upper surfaces of dielectric layer 102 and contact layer 108. Dielectric layer 105 may be patterned for defining locations for a cathode 110 and an anode 111. Along those lines, a cathodic-anodic conductive layer 144 may be deposited or otherwise formed to provide an anode 111 and a cathode 110 for bordering upper sidewall surfaces 155 respectively on opposing sides (e.g., right and left sides) of waveguide 106. Anode 111 may be formed over a contact for signal bus 109, and cathode 110 may be formed over a contact for signal bus 199.

EAS 300 is the same as SEAS 100 of FIG. 1, except that non-segmented anode 111 and non-segmented cathode 110 are formed in place of corresponding anode and cathode segments. Accordingly, same description is not repeated for purposes of clarity and not limitation. Moreover, conductive layer 144 may be used to form a PD anode and a PD cathode of one or more integrated PDs, as described below in additional detail.

Figure 13:
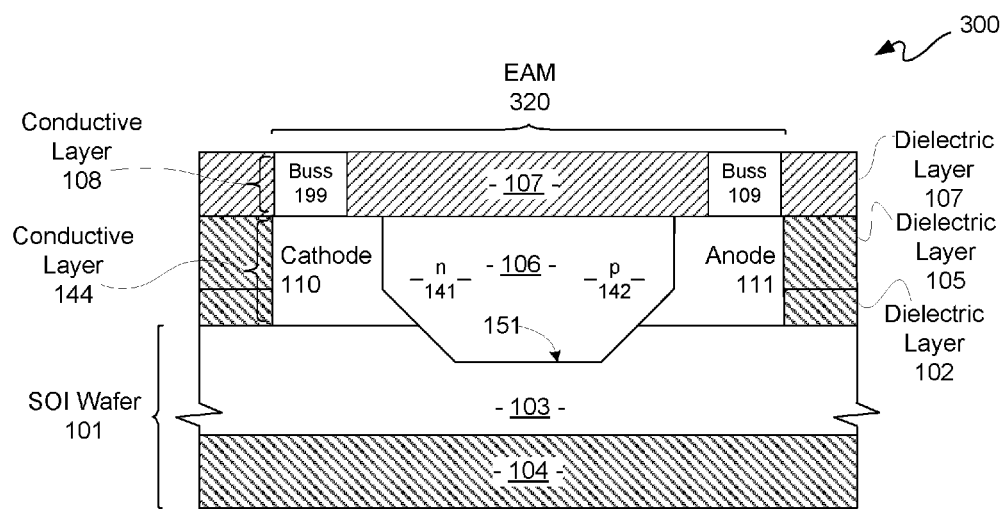
FIG. 13 is a block diagram illustratively depicting an end cross-sectional view of an exemplary EAS having another exemplary EAM.

FIG. 13 is a block diagram illustratively depicting an end-on cross-sectional view of another exemplary non-segment EAS 300 having another non-segmented EAM 320. As many of the details of the description of FIG. 13 are the same as for FIGS. 1, 2 and 12, those same details are generally not repeated for purposes of clarity and not limitation.

In this implementation, a single dielectric layer 105 or a combination of dielectric layers 102 and 105 may be deposited, and vias may be formed in such one or more dielectric layers such as with one or more via etches. Assuming a single dielectric layer 105 is to include dielectric layer 102 for purposes of clarity and not limitation, dielectric layer 105 may be patterned for defining locations for a non-segmented cathode 110 and a non-segmented anode 111, namely for receipt of conductive material from deposition of conductive layer 144. As EAS 300 of FIG. 13 is the same as SEAS 100 of FIG. 2, except that non-segmented anode 111 and non-segmented cathode 110 are formed in place of corresponding anode and cathode segments. Accordingly, same description is not repeated for purposes of clarity and not limitation. Moreover, conductive layer 144 may be used to form a PD anode and a PD cathode of one or more integrated PDs, as described below in additional detail.

In the above description of a SEAS 100, a SEAM 120 was used for a more than two level modulation, such as PAM4 for example. However, with reference to a non-segmented EAS 300, a two level modulation is used, such as NRZ.

Figure 14:
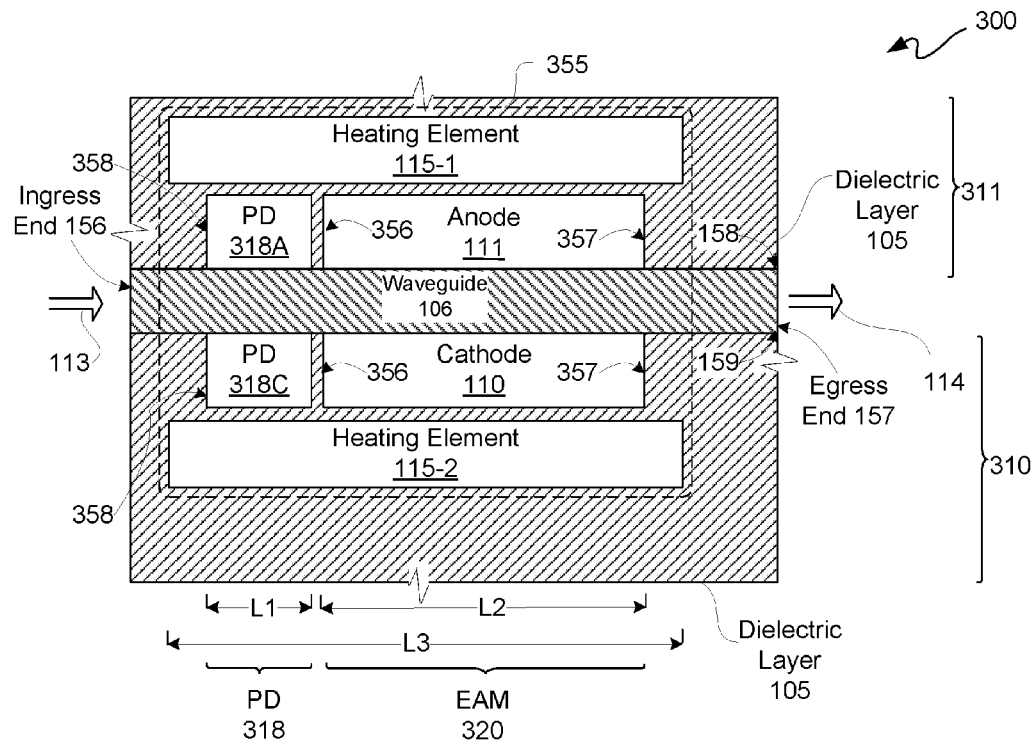
FIG. 14 is a block diagram of a top-down cross-sectional view illustratively depicting an exemplary EAS with an integrated photodetector ("PD") positioned for thermal sensing.

FIG. 14 is a block diagram of a top-down cross-sectional view illustratively depicting an exemplary EAS 300 with an integrated PD 318 positioned for thermal sensing. In this implementation, a PD 318 is located proximate to ingress end 156, and does not form part of EAM 320. However, in another implementation, PD 318 may be part of EAM 320.

PD 318 may include a detector anode 318A located alongside side 158 of waveguide 106 and a detector cathode 318C located alongside side 159 of waveguide 106. Detector anode 318A and detector cathode 318C may be aligned to one another on opposing sides of waveguide 106 and adjacent to sides 158 and 159, respectively. Detector anode 318A and detector cathode 318C may be formed along with anode segments 111 and cathode segments 110, as the same material may be used for all of these anodes and cathodes.

In a segmented implementation, detector anode 318A and detector cathode 318C may be spaced apart from a first stage of an anode segment 111-1 and a first stage of a cathode segment 110-1 for a SEAM 120. However, as in this implementation, detector anode 318A and detector cathode 318C may be spaced apart from an ingress side 356 of a unitary anode 111 and an ingress side 356 of a corresponding unitary cathode 110. Thus, PD 318 may be located between ingress end 156 of waveguide 106 and ingress side 356 of EAM 320. PD 318 may be configured to provide a photocurrent signal proportional to detected luminous intensity of input optical signal 113 for thermal sensing, as described below in additional detail.

By integrating a PD 318 proximate to an ingress side or end 356 of EAM 320, such as by cascading PD 318 and EAM 320 with reference to a same optical waveguide 106, thermal sensing of EAM 320 may be performed by PD 318. Along those lines, PD 318 and EAM 320 may be formed of the same materials, such as GeSi and dopants thereof for example for respective waveguide 106 portions as well as anode and cathode materials for such PD and EAM. However, PD 318 and EAM 320 may be spaced apart from one another for electrical isolation from each other, such as by dielectric material of dielectric layer 105 for example. This proximity between PD 318 and EAM 320 means that such device may be made of both same materials and formed by same processing operations.

EAM 320, like SEAM 120, is located with respect to waveguide 106 for electro-absorption modulation. Light of optical input signal 113 goes through PD 318, namely a waveguide 106 portion of PD 318, before entering a waveguide 106 portion of EAM 320, the latter of which modulates such light. However, because the length L1 of PD 318 is small as compared to the length L2 of EAM 320, insertion loss caused by PD 318 can be negligible.

PD 318 may be positioned proximate to EAM 320 to have correlated temperature changes, namely a common thermal environment 355. In other words, when temperature of PD 318 changes, a corresponding change in temperature occurs for EAM 320 due to having a local thermal environment in common. Along those lines, such temperature changes may affect the absorption coefficient for PD 318 and EAM 320 by a same, or substantially similar, amount of shift, namely within +/−1 percent of one another.

PD 318 may be located with respect to waveguide 106 for detecting an optical input signal 113 provided to ingress end 156 to provide a photocurrent proportional to detected luminous intensity of optical input signal 113, which may shift with respect to a change in the absorption coefficient of waveguide 106 due to a change in temperature.

EAM 320 has a modulator anode 111 alongside side 158 and a modulator cathode 110 alongside side 159, with modulator anode 111 and modulator cathode 110 having surfaces respectively facing sides 158 and 159 aligned to one another for providing an electric field across waveguide 106 from a first dopant portion to a second dopant portion to modulate optical input signal 113. Correspondingly, PD 318 has a detector anode 318A alongside side 158 and a detector cathode 318C alongside side 159.

At least one integrated heating element, such as either or both integrated heating elements 115-1 and 115-2, may be respectively located lengthwise alongside and spaced apart from both PD 318 and EAM 320. In other words, a length L3 of a heating element 115 may span a combined length of L1 and L2, as well as a gap therebetween, and may be located on either or both an anode side or a cathode side with respect to waveguide 106. Moreover, length L3 of a heating element 115 may extend beyond an ingress side or end 358 of PD 318 and/or an egress side or end 357 of EAM 320. The ingress and egress of light into PD 318 and EAM 320 is actually in waveguide 106, and so the terms "side" or "end" with ingress or egress is used to distinguish the actual ingress or egress from associated sides or ends. In this implementation, integrated heating element 115-1 is located alongside and spaced apart from both detector anode 318A and modulator anode 111 on an anode side 311 of EAS 300, or an anode side 311 with respect to waveguide 106, and integrated heating element 115-2 is located alongside and spaced apart from both detector cathode 318C and modulator cathode 110 on a cathode side 310 of EAS 300, or a cathode side 310 with respect to waveguide 106.

An integrated heater 165, as previously described, may be used to control temperature for a combination of PD 318 and EAM 320, namely as a device structure. Along those lines, a PD 318 and at least two heating elements 115 may be part of a thermal control loop used to control an integrated heater 165. In this implementation, an integrated heater 165 may include one or more heating elements 115, and such heating elements may be segmented and/or unitary.

By tracking optical power absorbed by PD 318, temperature of a device structure can be inferred, including inferring temperature of EAM 320. By having PD 318 proximate to EAM 320, an inference or correlation of thermal gradients may be closely controlled responsive to a photocurrent generated by PD 318. By locking a PD photocurrent to predetermined reference level with feedback, temperature of a device structure may be stabilized. In other words, temperature of EAM 320, as well as PD 318, may be stabilized. Having thermal stability within +/−1 degree Celsius provides for corresponding stability in an output optical eye diagram of optical output signal 114 after modulation by EAM 320.

Figure 15:
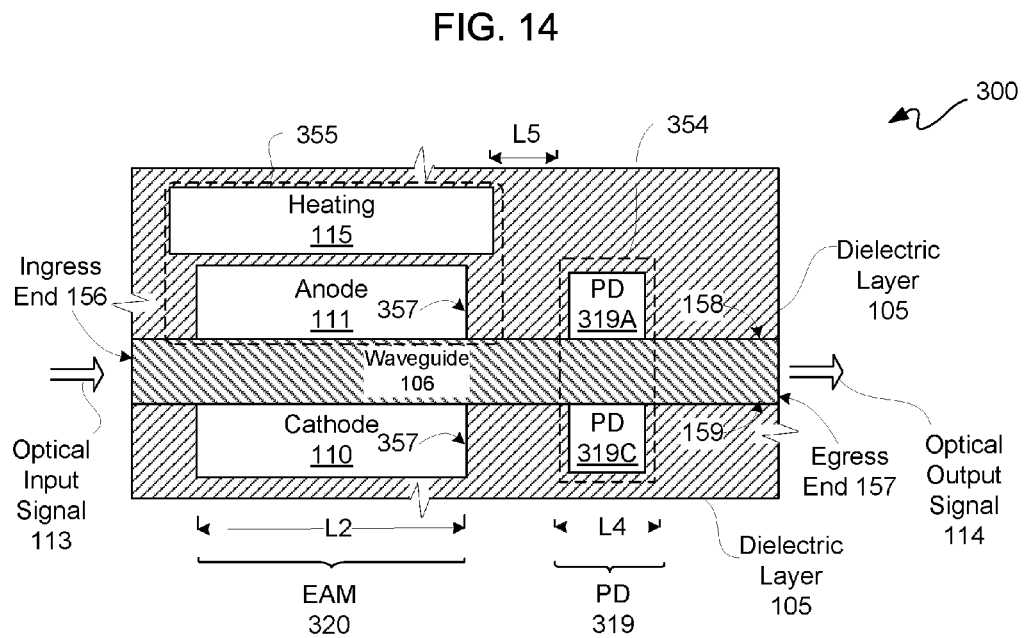
FIG. 15 is a block diagram of a top-down cross-sectional view illustratively depicting an exemplary EAS with an integrated PD positioned for optical modulation amplitude ("OMA") sensing.

FIG. 15 is a block diagram of a top-down cross-sectional view illustratively depicting an exemplary EAS 300 with an integrated PD 319 positioned for optical modulation amplitude ("OMA") sensing. In this implementation, a PD 319 is located proximate to egress end 157, and does not form part of EAM 320. However, in another implementation, PD 319 may be part of EAM 320.

PD 319 may include a detector anode 319A located alongside side 158 of waveguide 106 and a detector cathode 319C located alongside side 159 of waveguide 106. Detector anode 319A and detector cathode 319C may be aligned to one another on opposing sides of waveguide 106 and adjacent to sides 158 and 159, respectively. Detector anode 319A and detector cathode 319C may be formed along with anode segments 111 and cathode segments 110, as the same material may be used for all of these anodes and cathodes.

In a segmented implementation, detector anode 319A and detector cathode 319C may be spaced apart from a last stage of an anode segment 111-N and a last stage of a cathode segment 110-1 for a SEAM 120. However, in this implementation, detector anode 319A and detector cathode 319C may be spaced apart from an egress side 357 of a unitary anode 111 and an egress side 357 of a corresponding unitary cathode 110. Thus, PD 319 may be located between egress end 157 of waveguide 106 and egress side 357 of EAM 320. PD 319 may be configured to provide a photocurrent signal proportional to detected amplitude to detect an OMA of output optical signal 114 for OMA sensing, as described below in additional detail.

By integrating a PD 319 spaced apart from an egress side or end 357 of EAM 320, such as by cascading EAM 320 and PD 319 with reference to a same optical waveguide 106, amplitude detection of OMA sensing of an EAM 320 modulated optical output signal 114 may be performed by PD 319 with less thermal bias. Of course, light passing through waveguide 106 is a heat generator, and so some thermal impact may result therefrom on PD 319. However, assuming a minimum lengthwise distance L5 of approximately 10 microns, heat conducted through dielectric layer 105 from EAM 320, as well as an optional heating element, may be substantially attenuated by thermal isolation spacing so as to enhance OMA detection. In other words, light passes through EAM 320 prior to OMA sensing by PD 319, so PD 319 may be positioned to sense OMA of EAM 320 modulated light. Responsivity of OMA detection by PD 319 may be enhanced by having PD 319 positioned away from EAM 320, namely positioned far enough away so as to be relatively insensitive to temperature fluctuations of EAM 320.

Along those lines, PD 319 and EAM 320 may be formed of the same material, such as GeSi for example for respective waveguide 106 portions thereof, and PD 319 and EAM 320 may be spaced apart from one another for thermal isolation from each other, such as by dielectric material of dielectric layer 105 for example, as well as for thermal isolation from one or more heating elements 115. For OMA sensing, a waveguide 106 portion associated with or of PD 319 may be formed of a material different from a waveguide 106 portion associated with or of EAM 320. Along those lines, a waveguide 106 portion associated with or of PD 319 may be formed of Ge, whereas a waveguide 106 portion associated with or of EAM 320 may be formed of GeSi. This should not be taken to mean that a waveguide 106 portion associated with or of PD 319 is void of any Si, though such an implementation may be used; rather, such waveguide 106 portion associated with or of PD 319 is formed so as to have substantially less Si than a waveguide 106 portion associated with or of EAM 320.

EAM 320, like SEAM 120, is located with respect to waveguide 106 for electro-absorption modulation. Light of optical input signal 113 goes through a waveguide 106 portion of EAM 320 before entering a waveguide 106 portion of PD 319, namely a waveguide 106 portion of PD 319. However, because the length L4 of PD 319 is small as compared to the length L2 of EAM 320, insertion loss caused by PD 319 can be negligible.

PD 319 may be positioned distally with respect to EAM 320 to output current of PD 319 for tracking an eye opening of EAM 320 modulated light with sufficient insensitivity to temperature changes or fluctuations of EAM 320. In other words, PD 319 has a self-defined local thermal environment 354 separate from a local thermal environment 355 as defined by one or more heating elements 115 in which local thermal environment 355 EAM 320 is located. Having OMA detection by PD 319 be sufficiently responsive due to sufficient thermal isolation from EAM 320 does not preclude use of a thermal control loop. PD 319 may be located with respect to waveguide 106 for detecting modulated light for an optical output signal 114 provided to egress end 157 to provide a photocurrent proportional to detected OMA of such light, which may shift with respect to a change in the absorption coefficient due to a change in temperature.

EAM 320 has a modulator anode 111 alongside side 158 and a modulator cathode 110 alongside side 159, with modulator anode 111 and modulator cathode 110 having surfaces respectively facing sides 158 and 159 and aligned to one another for providing an electric field across waveguide 106 from a first dopant portion to a second dopant portion to modulate optical input signal 113. Correspondingly, PD 319 has a detector anode 319A alongside side 158 and a detector cathode 319C alongside side 159.

Optionally, at least one integrated heating element 115, such as either or both integrated heating elements 115-1 and 115-2 of FIG. 14, may be respectively located lengthwise alongside and spaced apart from EAM 320. However, such heating element 115 may be longitudinally spaced away from PD 319 by a length L5 in order to provide sufficient thermal separation to reduce temperature fluctuations negatively impacting OMA sensing by PD 319.

With respect to both of FIGS. 14 and 15, an EAM 320 may include a PD 318 and/or a PD 319 closely integrated with such EAM 320 for a compacted configuration, though with sufficient separation with respect to EAM 320 and PD 319 for OMA detection. In either implementation, a thermal control loop may be implemented to stabilize temperature to enhance modulation by such EAM 320 and/or to enhance OMA detection by PD 319.

Figure 16:
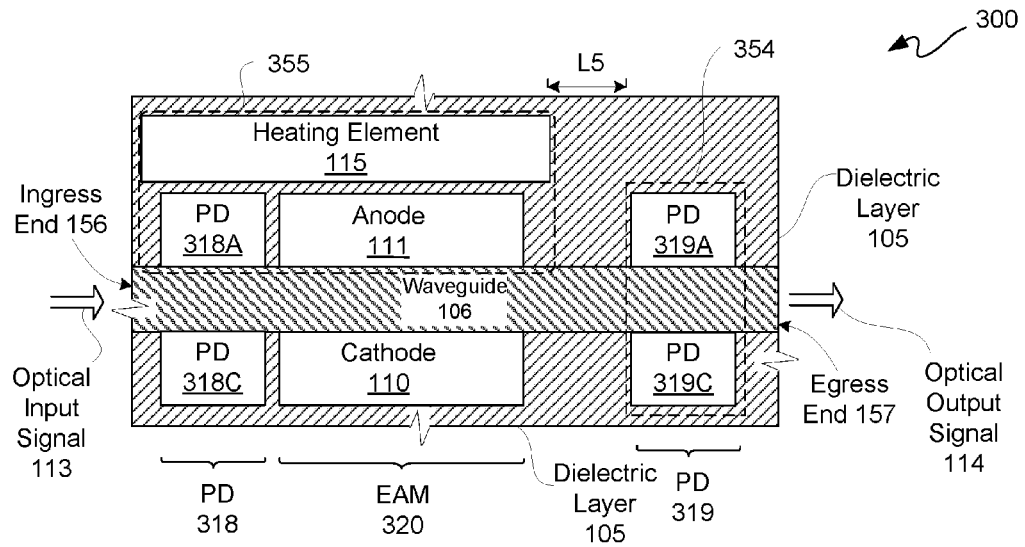
FIG. 16 is a block diagram of a top-down cross-sectional view illustratively depicting an exemplary EAS with an integrated PD positioned for thermal sensing and another integrated PD positioned for OMA sensing.

FIG. 16 is a block diagram of a top-down cross-sectional view illustratively depicting an exemplary EAS 300 with an integrated PD 318 positioned for thermal sensing and an integrated PD 319 positioned for OMA sensing. Effectively, EAS 300 of FIG. 16 is a combination of EAS 300 of each of FIGS. 14 and 15 which together form a PD-EMA-PD configuration. Accordingly, the above description is not repeated for purposes of clarity and not limitation with respect to EAS 300 of FIG. 16.

Light enters waveguide 106 at ingress end 156 as an optical input signal for intensity sensing by PD 318 to provide a photocurrent proportional to optical power which is affected by absorption, which is affected by temperature, and thus such photocurrent is an indicator of an effect of temperature on signal light. Such photocurrent may be provided as part of a feedback control loop for thermal control for adjusting temperature of heating element 115 for heating both PD 318 and EAM 320 together. After passing through PD 318, such light is modulated by EAM 320, and such modulated light is sensed for OMA detection by PD 319 which provides an output current proportional to sensed amplitude of such modulated light. By having PD 319 in a local thermal environment separate from a local thermal environment of heating element 115, PD 318, and EAM 320, thermal tuning may be provided for thermal control of EAM 320 with OMA detection by PD 319 for data eye control within a same integrated device structure for a compact footprint.

Figure 17:
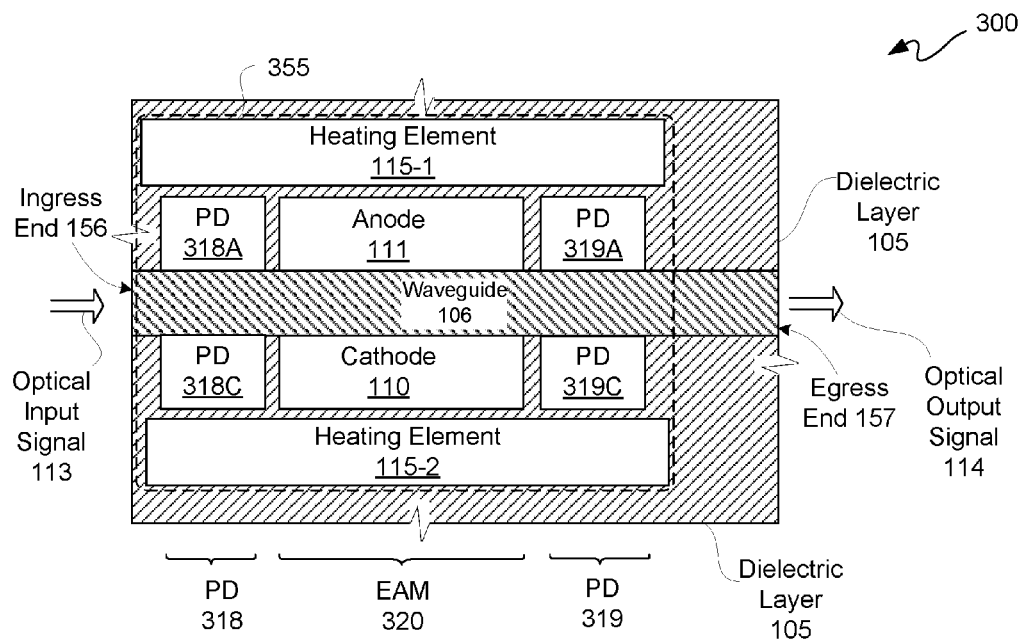
FIG. 17 is a block diagram of a top-down cross-sectional view illustratively depicting an exemplary EAS with an integrated PD positioned for thermal sensing and another integrated PD positioned for OMA sensing with both PDs in a same or common thermal environment defined by a heating element for an EAM.

FIG. 17 is a block diagram of a top-down cross-sectional view illustratively depicting an exemplary EAS 300 with an integrated PD 318 positioned for thermal sensing and an integrated PD 319 positioned for OMA sensing with both PDs in a same or common thermal environment 355 defined by a heating element 115. Effectively, EAS 300 of FIG. 17 is a PD-EAM-PD configuration sandwiched between heating elements 115-1 and 115-2. Thus, a PD 318-EAM 320-PD 319 configuration may be entirely within a same local thermal environment 355 defined by heating elements 115-1 and 115-2.

Much of the above description is not repeated for purposes of clarity and not limitation with respect to EAS 300 of FIG. 17. In this implementation, PD 319 may be used, or may be replaced with an intensity sensing PD rather than an OMA sensing PD 319. PD 319 may be spaced apart from though proximal to an egress side 357 of EAM 320. Length of heating elements 115-1 and 115-2 may extend beyond outer ends of such PD 318-EAM 320-PD 319 configuration. Thus, both PD 318 and PD 319 may be disposed between heating elements 115-1 and 115-2. In this configuration, PD 319 is not spaced apart from EAM 320 for thermal isolation, as thermal fluctuations of EAM 320 may be controlled within a tolerance, as may vary from application-to-application.

Figure 18:
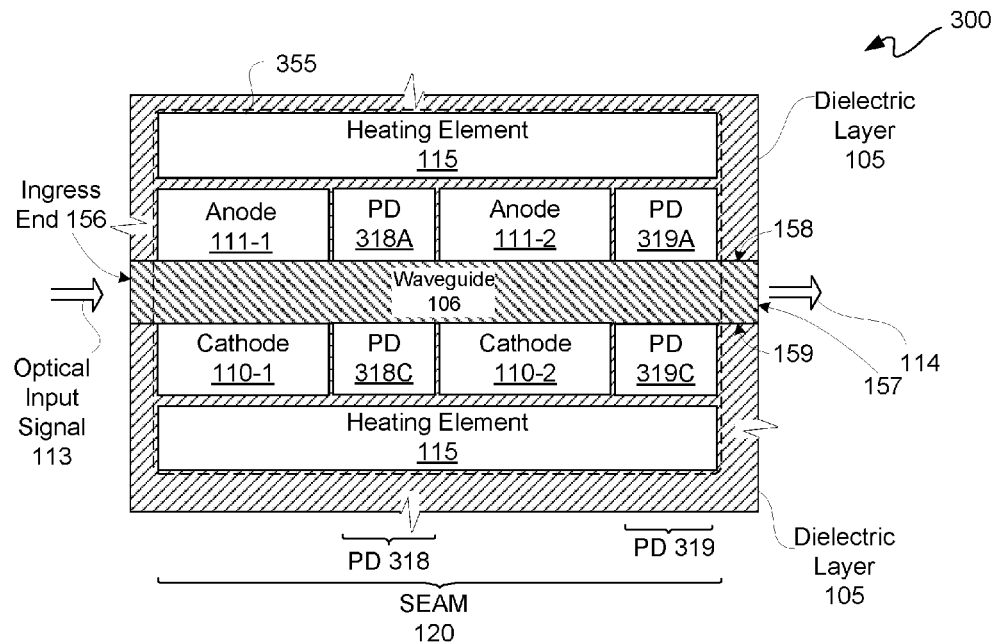
FIG. 18 is a block diagram of a top-down cross-sectional view illustratively depicting an exemplary EAS with an integrated PD positioned for thermal sensing and another integrated PD positioned for OMA sensing with both PDs in a same or common thermal environment defined by a heating element 115 for a SEAM.

FIG. 18 is a block diagram of a top-down cross-sectional view illustratively depicting an exemplary EAS 300 with an integrated PD 318 positioned for thermal sensing and an integrated PD 319 positioned for OMA sensing with both PDs in a same or common thermal environment 355 defined by a heating element 115 for a SEAM 120. Rather than an EAM 320 with unitary anodes and cathodes, a SEAM 120 is used having at least two anode segments 111-1 and 111-2 and at least two corresponding cathode segments 110-1 and 110-2. As much of the above description applies to the description of FIG. 18, such description is generally not repeated for purposes of clarity and not limitation.

PD 318 is position as before with respect to waveguide 106, but is disposed between pairs of anode/cathode segments. For example, a detector anode 318A is located between and spaced apart from anode segment 111-1 and anode segment 111-2 along a side 158 of waveguide 106, and likewise a detector cathode 318C is located between and spaced apart from a cathode segment 110-1 and a cathode segment 110-2 along a side 159 of waveguide 106. In this configuration, PD 318 may be used for sensing either or both intensity of light for thermal sensing or OMA of light for eye opening of a partial or a segment of modulation of such light.

Figure 19:
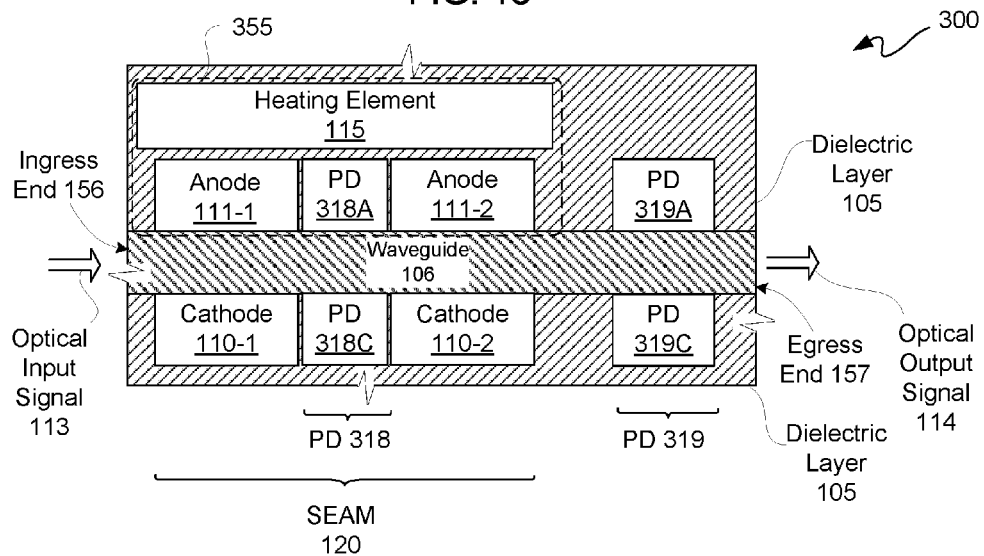
FIG. 19 is a block diagram of a top-down cross-sectional view illustratively depicting an exemplary EAS with an integrated PD positioned for thermal sensing and another integrated PD positioned for OMA sensing with such PDs in a different local thermal environments.

FIG. 19 is a block diagram of a top-down cross-sectional view illustratively depicting an exemplary EAS 300 with an integrated PD 318 positioned for thermal sensing and an integrated PD 319 positioned for OMA sensing with such PDs in different local thermal environments. As much of the above description applies to the description of FIG. 18, such description is generally not repeated for purposes of clarity and not limitation.

A SEAM 120 is used having at least two anode segments 111-1 and 111-2 and at least two corresponding cathode segments 110-1 and 110-2. A PD 318 is position as before with respect to waveguide 106, but is disposed between pairs of anode/cathode segments. For example, a detector anode 318A is located between and spaced apart from anode segment 111-1 and anode segment 111-2 along a side 158 of waveguide 106, and likewise a detector cathode 318C is located between and spaced apart from a cathode segment 110-1 and a cathode segment 110-2 along a side 159 of waveguide 106. In this configuration, PD 318 may be used for sensing either or both intensity of light for thermal sensing or OMA of light for eye opening of a partial or a segment of modulation of such light.

In this implementation, PD 319 is spaced away from heating element 115 for OMA sensing. PD 319 may be spaced apart from an egress side 357 of EAM 320 too. Length of heating elements 115 may extend beyond outer ends of such PD 318-EAM 320 configuration. Thus, PD 318 and EAM 320 may be disposed proximal to a heating element 115, or between heating elements 115-1 and 115-2 in another implementation, with PD 319 spaced away from such heating element or elements for OMA sensing. PD 319 has a self-defined local thermal environment 354 separate from a local thermal environment 355 as defined by one or more heating elements 115 in which local thermal environment 355 PD 318 and EAM 320 are located.

Figure 20:
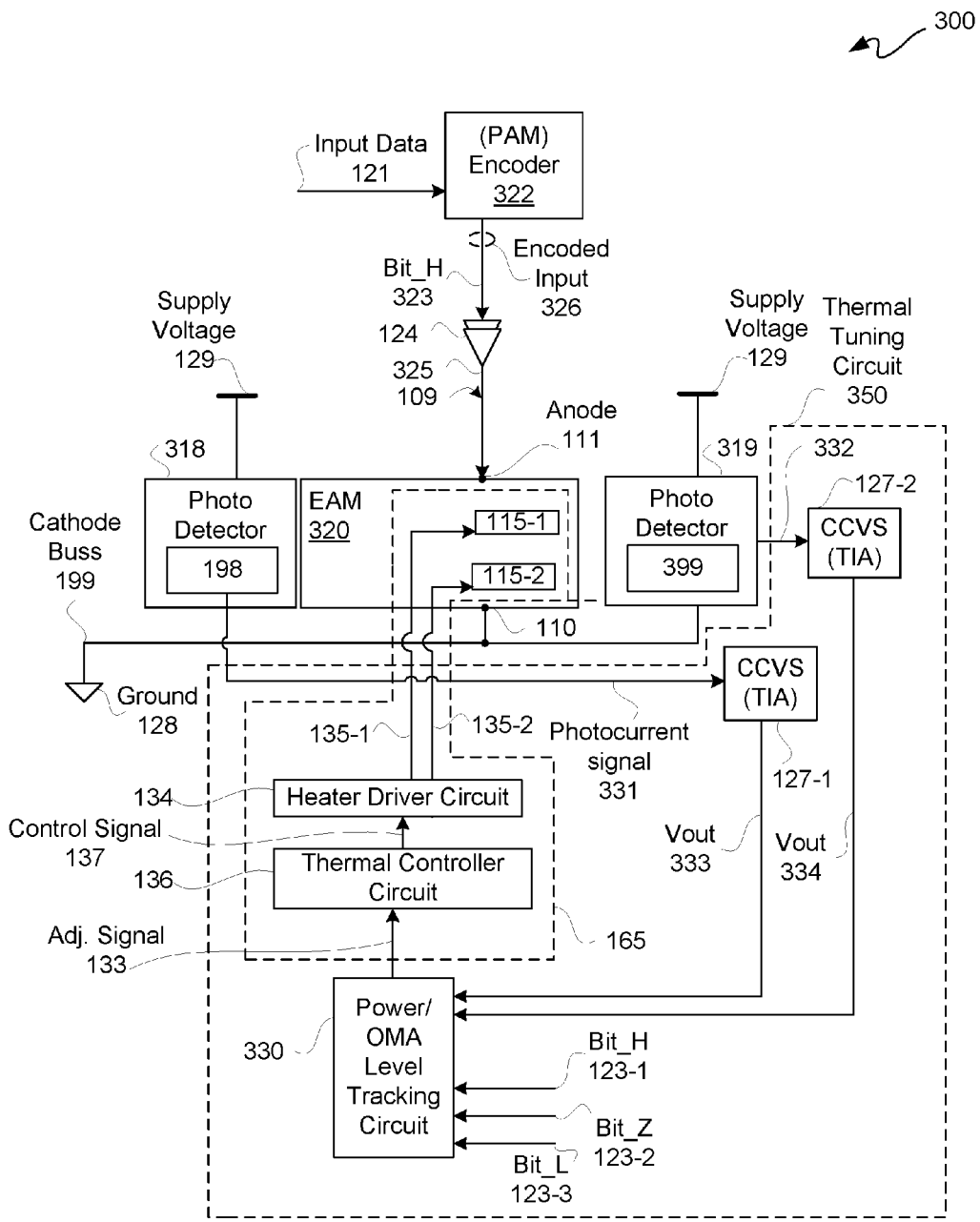
FIG. 20 is a schematic diagram illustratively depicting an exemplary EAS for a transmitter for an electrical domain.

FIG. 20 is a schematic diagram illustratively depicting an exemplary EAS 300 for a transmitter for an electrical domain. FIG. 20 is further described with simultaneous reference to FIGS. 1 through 20; however, for purposes of clarity by way of example and not limitation, it shall be assumed that EAS 300 of FIG. 16 is implemented.

Prior to being modulated, if at all, by EAM 320, optical input signal 113 may pass through waveguide 106 proximate to PD 318, namely a waveguide 106 portion between PD anode 318A and PD cathode 318C, of EAM 320. PD 318 may include a photodiode circuit 198 having a photodiode, where such PD circuit 198 may be conventional, and thus is not described in unnecessary detail for purposes of clarity and not limitation. For adaptive thermal tuning in this example, a photodiode for PAM bi-level detection may be implemented near a buss ingress end 156 of waveguide 106, namely along waveguide 106 prior to EAM 320.

PD 318, which may be biased between a PD supply voltage 129 and ground 128, may output a photocurrent signal 331 from PD circuit 198, responsive to detected photons, namely detected luminous intensity, of optical input signal 113 passing through a portion of waveguide 106. In an implementation, optical input signal 113 may be a laser beam, such as from a laser diode for example, and EAS 300 may be in a photonic integrated circuit. Photocurrent signal 331 output from PD 318 may represent power of optical input signal 113, as detected luminous intensity passing through a waveguide is related to power, as is known.

Input data 121 is provided to an encoder 322. In this example, encoder 322 is a PAM or PAM2 encoder; however, in another implementation another type of bi-level modulation may be used to encode input data 121 with an encoder.

Output of encoder 322 is an encoded input 326. In this example for a PAM encoded input 326, a "high" bit ("Bit_H") drive signal 323 may be active for a high state, or, for a "low" bit ("Bit_L") drive signal, high bit drive signal 323 may be inactive for a low state. However, in another implementation, two drive signals may be output from an encoder in a one-hot configuration for encoding responsive to input data 121.

In this example, an encoded input 326 to EAM 320 as output from encoder 322 has a greatest amount of controlled electro-optical absorption responsive to a logic high input of input data 121 resulting in assertion of drive signal 323. In this example, an encoded input 326 to EAM 320 as output from encoder 322 has a least amount of absorption responsive to a logic low input of input data 121 resulting in drive signal 323 not being asserted. Generally, two steps in light may be controlled by electro-absorption to provide detectable amplitude levels, whether thermometer, binary, or otherwise encoded.

In this example, EAM 320 is driven by a corresponding NRZ voltage-mode driver 124, which is respectively coupled to receive drive signals 323. Implementation of an NRZ voltage mode driver 124 is significantly less complex and uses less power than a high-speed DAC.

NRZ voltage output 325 of NRZ voltage mode driver 124 responsive to drive signals 323 may provide an NRZ voltage to anode 111. Anode 111 of EAM 320 may receive an NRZ voltage of NRZ voltage output 325 via anode signal buss 109. Though NRZ voltages are used, other types of voltages may be used, such as a non-NRZ voltage or an inverted NRZ ("NRZI") voltage for example.

An NRZ voltage may be applied to anode 111 for conducting an electric field to corresponding cathode 110 through a corresponding portion of waveguide 106. Cathode 110 may be coupled to ground 128 through a cathode buss 199. Encoded input 326 may thus be used to modulate input optical signal 113 by electro-optical modulation thereof to provide a modulated output optical signal 114, where such modulation effectively represents a modulation code of an encoded input 326. Cathode 110 may have a surface area facing a surface area of anode 111 across waveguide 106.

After being modulated, if at all, by EAM 320, optical input signal 113 may pass through waveguide 106 proximate to PD 319, namely through a waveguide 106 portion between PD anode 319A and PD cathode 319C, of EAM 320. PD 319 may include an OMA circuit 399 to detect amplitude, which may be conventional, and thus is not described in unnecessary detail for purposes of clarity and not limitation.

PD 319, which may be biased between a PD supply voltage 129 and ground 128, may output a photocurrent signal 332 responsive to detected photons, namely detected amplitude, of optical output signal 114 passing through waveguide 106. Photocurrent signal 332 output from PD 319 may represent an OMA data eye of optical output signal 114 associated with a PAM thereof, which in this example generally is a data eye having two distinct pulse amplitude levels.

Thermal tuning circuit 350 may have either a one or two variable input thermal control loop. For a two variable input thermal control loop, a CCVS 127-1 may be configured to receive photocurrent signal 331 to provide an output voltage signal ("Vout") 333, and a CCVS 127-2 may be configured to receive photocurrent signal 332 to provide an output voltage signal ("Vout") 334. CCVS 127-1 and 127-2 may be circuits implemented for example with respective TIAs.

A level tracking circuit 330 of thermal tuning circuit 350 may be configured to receive output voltage signals 333 and 334 to provide an eye opening adjustment signal 133. Level tracking circuit 330 may be configured for power-level and OMA-level tracking in order to know what modulating states to look for in an eye opening of an optical output signal 114. Level tracking circuit 330 may be configured to receive one or more drive signals 123 to know a priori an intended modulation level. Level tracking circuit 330 may be configured responsive to states of one or more drive signals 123 and output voltage signals 333 and 334 to determine whether linearity of an eye opening with respect to any one or more amplitude levels thereof is to be adjusted to enhance any one or more corresponding amplitude level's linearity.

A thermal controller 136 of thermal tuning circuit 350 may be configured to receive eye opening adjustment signal 133 from level tracking circuit 330 to provide a thermal control signal 137. Thermal control signal 137 may be an N-bit coded signal. A heater driver 134 of thermal tuning circuit 350 may be configured to receive thermal control signal 137 to assert none or one or more of heater activation signals 135, such as in this example heater activation signals 135-1 and 135-2 respectively to heating elements or segments 115-1 and 115-2. Along those lines, it should be understood that an input optical signal 113 may be a heat source heating waveguide 106 for example, and thus power of such input optical signal 113 may be an indicator related to the amount of heat given off by such an input optical signal. Additionally, an absorption curve of EAM 320 for waveguide 106 has a temperature dependent variable component, and so OMA may be related to such a temperature dependent variable component of EAM. Along those lines, OMA may be used to provide another indicator associated with heat of waveguide 106.

Heating elements 115-1 and 115-2 of an integrated heater 165 may be separately controlled by thermal controller circuit 136 of integrated heater 165 and separately driven by heater driver circuit 134 of integrated heater 165. In this example, it shall be assumed that both an anode-side heating element 115-1 and a cathode-side heating element 115-2 corresponding to one another are implemented. Although heating element 115-1 and 115-2 may be both be coupled to heater driver 134, each anode-side and cathode-side heating element may be separately controlled by thermal controller circuit 136 and separately driven by heater driver circuit 134. However, in another implementation, an anode-cathode-side of heating element pair may be commonly coupled to receive a corresponding heater activation signal without being independently controlled with respect to one another.

Heating activation signals 135-1 and 135-2 respectively provided to heating elements 115-1 and 115-2 may be used to independently tune anode 111 and cathode 110 to different or same temperatures. In this implementation, control signal 137 may indicate to heater driver circuit 134 that either, neither, or both of heating elements 115-1 and 115-2 is to be turned on or off, or maintained in a current state, to perform an adaptive adjustment for fine tuning of linearity of optical PAM amplitude levels.

Providing flexibility in compensating for temperature fluctuations through control of one or more integrated heating elements 115 facilitates enhancing linearity of EAM 320. An integrated heater 165 may be used to adjust temperature of heating elements 115 independently of one another through thermal controller circuit 136 and heater driver circuit 134, where heater driver circuit 134 has separate drivers corresponding to heating elements. Thus, in addition to compensating for nonlinearity of EAM 320 for optical PAM transmission without having to have a DAC for such compensation, integrated photodiodes and separate heating elements may be used for adaptive thermal tuning for PAM modulation.

Along those lines, thermal tuning circuit 350 of an electrical domain of EAS 300 may have a thermal control loop with two variable inputs respectively from PD 318 and PD 319; optionally, in another implementation either of PDs 318 or 319 may be omitted. However, in such an implementation, such thermal control loop may be operated with one variable input from such integrated PD used.

To recapitulate, a compact integration of one or more sensing PDs with an EAM or a SEAM for thermal control and/or data eye control, which saves area and simplifies layout, has been described. Such a sensing PD may use the same materials as a corresponding SEAM or EAM, which simplifies the temperature tracking. OMA tracking is supported for transmitter eye enhancement with an OMA detecting PD. A thermal control loop may be implemented for an EAS having either both a power tracking PD and an OMA tracking PD. With tracking information from one or more integrated PDs, an integrated heater may provide thermal control to adjust heater output power to control temperature of an EAM or SEAM.

Figure 21:
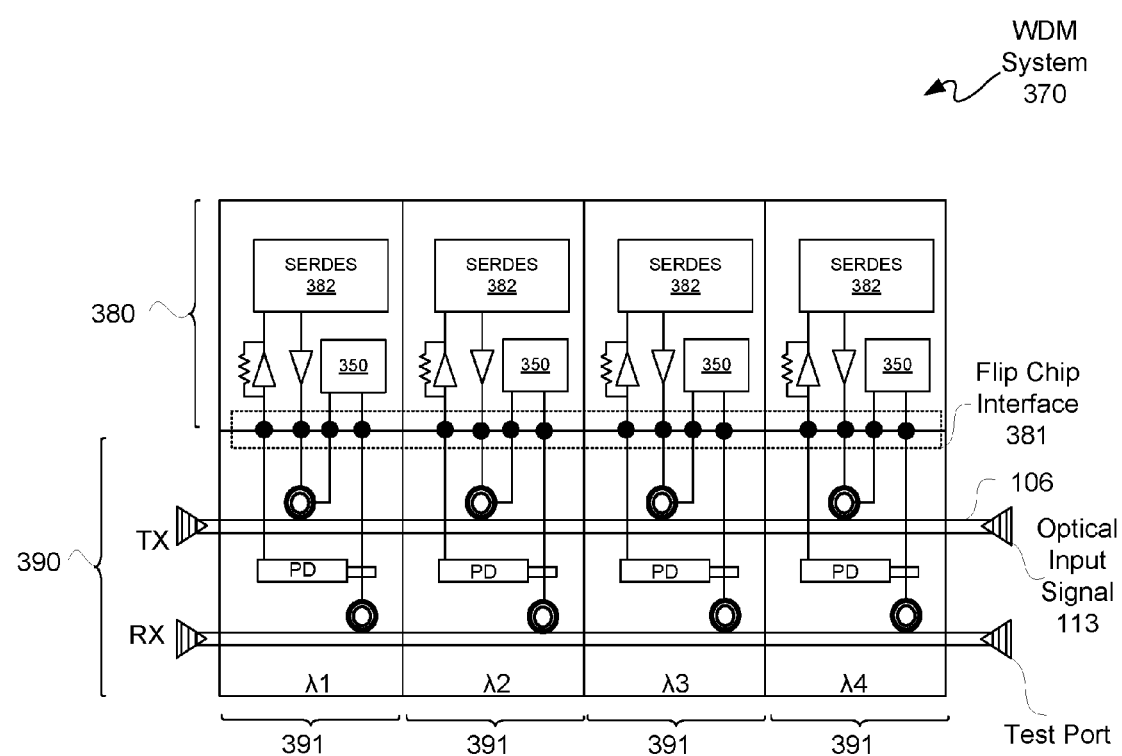
FIG. 21 is a block diagram illustratively depicting an exemplary wavelength division multiplexing ("WDM") system.

FIG. 21 is a block diagram illustratively depicting an exemplary wavelength division multiplexing ("WDM") system 370. WDM system 370 may include an electrical domain IC 380 and a photonics IC 390. ICs 380 and 390 may be coupled to one another through a micro bump interface, such as a flip-chip interface 381 for example. ICs 380 and 390 may be segregated into wavelength sections 391 for two or more different wavelengths, which in this example is for four different wavelengths. Waveguide 106 may receive an optical input signal 113 for passing through each of such segregated wavelength sections 391 of IC 390. IC 390 may include one or more heating elements, one or more PDs, and/or an EAM or a SEAM as described herein. IC 380 in each of wavelength sections 391 may include a respective thermal tuning circuit 350 and a respective serializer-deserializer ("SERDES") 382. Thermal tuning circuit 350 and SERDES 382 may be implemented in an IC, such as an FPGA or ASIC or other IC.

Figure 22:
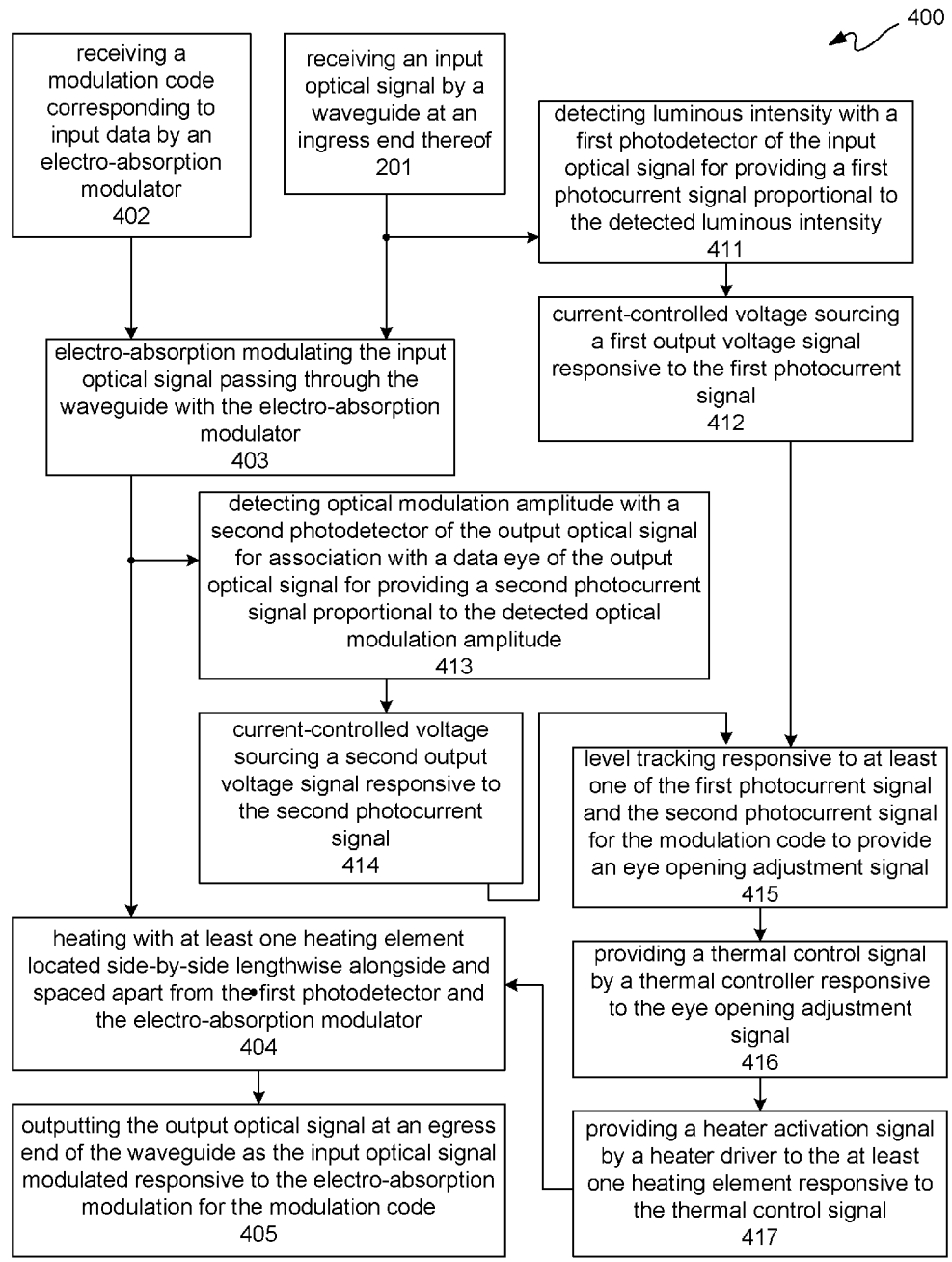
FIG. 22 is a flow diagram illustratively depicting an exemplary electro-absorption modulation process for an EAM.

FIG. 22 is a flow diagram illustratively depicting an exemplary electro-absorption modulation process 400. FIG. 22 is further described with simultaneous reference to FIGS. 12 through 22.

At 201, an input optical signal 113 may be received by a waveguide 106 at an ingress end 156. At 402, generally at about the same time input optical signal 113 is received, a modulation code of encoded input 326 corresponding to input data 121 may be received by a EAM 320.

At 403, input optical signal 113 may be electro-absorption modulated by EAM 320 as such light signal passes through a corresponding portion of waveguide 106 with EAM 320 adjacent to waveguide 106. At 404, an integrated heater 165 having at least one heating element 115 may be used for heating a corresponding anode 111 and/or cathode 110. Such at least one heating element 115 may be located side-by-side lengthwise alongside and spaced apart from PD 318 and EAM 320, as previously described. At 405, an output optical signal 114 may be output at an egress end 157 of waveguide 106 as input optical signal 113 modulated responsive to electro-absorption modulation for such modulation code.

For thermally controlled heating at 404, operations 411 through 417 may be used. Along those lines, from 201, at 411 an optical input signal 113 may be detected for luminous intensity with PD 318 for providing a photocurrent signal 331 proportional to such detected luminous intensity. From 411, at 412 from a CCVS 127-1 an output voltage 333 may be sourced responsive to photocurrent signal 331. From 403, at 413 an output optical signal 114 may be obtained and OMA thereof may be detected at with a PD 319 of such an output optical signal 114 prior to output at 405 for association with a data eye of such output optical signal 114 for providing a photocurrent signal 332 proportional to detected OMA. Photocurrent signal 332 for a data eye may be associated with a PAM having two distinct pulse amplitude levels. From 413, at 414 from a CCVS 127-2 an output voltage 334 may be sourced responsive to photocurrent signal 332.

At 415, level tracking of output voltage signal 114 for a modulation code may be performed to provide an eye opening adjustment signal 133 using level tracking circuit 330. Such level tracking may be responsive to at least one of photocurrent signal 331 for tracking power level and/or photocurrent signal 332 for OMA level tracking for a modulation code to provide an eye opening adjustment signal 133. At 416, a thermal control signal 137 may be provided by a thermal controller circuit 136 responsive to such eye opening adjustment signal 133. At 417, least one heater activation signal 135 may be provided by a heater driver circuit 134 to at least one heating element 115 responsive to thermal control signal 137 for heating at 404.

Because one or more of the examples described herein may be implemented in an FPGA, a detailed description of such an IC is provided. However, it should be understood that other types of ICs may benefit from the technology described herein.

Programmable logic devices ("PLDs") are a well-known type of integrated circuit that can be programmed to perform specified logic functions. One type of PLD, the field programmable gate array ("FPGA"), typically includes an array of programmable tiles. These programmable tiles can include, for example, input/output blocks ("IOBs"), configurable logic blocks ("CLBs"), dedicated random access memory blocks ("BRAMs"), multipliers, digital signal processing blocks ("DSPs"), processors, clock managers, delay lock loops ("DLLs"), and so forth. As used herein, "include" and "including" mean including without limitation.

Each programmable tile typically includes both programmable interconnect and programmable logic. The programmable interconnect typically includes a large number of interconnect lines of varying lengths interconnected by programmable interconnect points ("PIPs"). The programmable logic implements the logic of a user design using programmable elements that can include, for example, function generators, registers, arithmetic logic, and so forth.

The programmable interconnect and programmable logic are typically programmed by loading a stream of configuration data into internal configuration memory cells that define how the programmable elements are configured. The configuration data can be read from memory (e.g., from an external PROM) or written into the FPGA by an external device. The collective states of the individual memory cells then determine the function of the FPGA.

Another type of PLD is the Complex Programmable Logic Device, or CPLD. A CPLD includes two or more "function blocks" connected together and to input/output ("I/O") resources by an interconnect switch matrix. Each function block of the CPLD includes a two-level AND/OR structure similar to those used in Programmable Logic Arrays ("PLAs") and Programmable Array Logic ("PAL") devices. In CPLDs, configuration data is typically stored on-chip in non-volatile memory. In some CPLDs, configuration data is stored on-chip in non-volatile memory, then downloaded to volatile memory as part of an initial configuration (programming) sequence.

For all of these programmable logic devices ("PLDs"), the functionality of the device is controlled by data bits provided to the device for that purpose. The data bits can be stored in volatile memory (e.g., static memory cells, as in FPGAs and some CPLDs), in non-volatile memory (e.g., FLASH memory, as in some CPLDs), or in any other type of memory cell.

Other PLDs are programmed by applying a processing layer, such as a metal layer, that programmably interconnects the various elements on the device. These PLDs are known as mask programmable devices. PLDs can also be implemented in other ways, e.g., using fuse or antifuse technology. The terms "PLD" and "programmable logic device" include but are not limited to these exemplary devices, as well as encompassing devices that are only partially programmable. For example, one type of PLD includes a combination of hard-coded transistor logic and a programmable switch fabric that programmably interconnects the hard-coded transistor logic.

Figure 23:
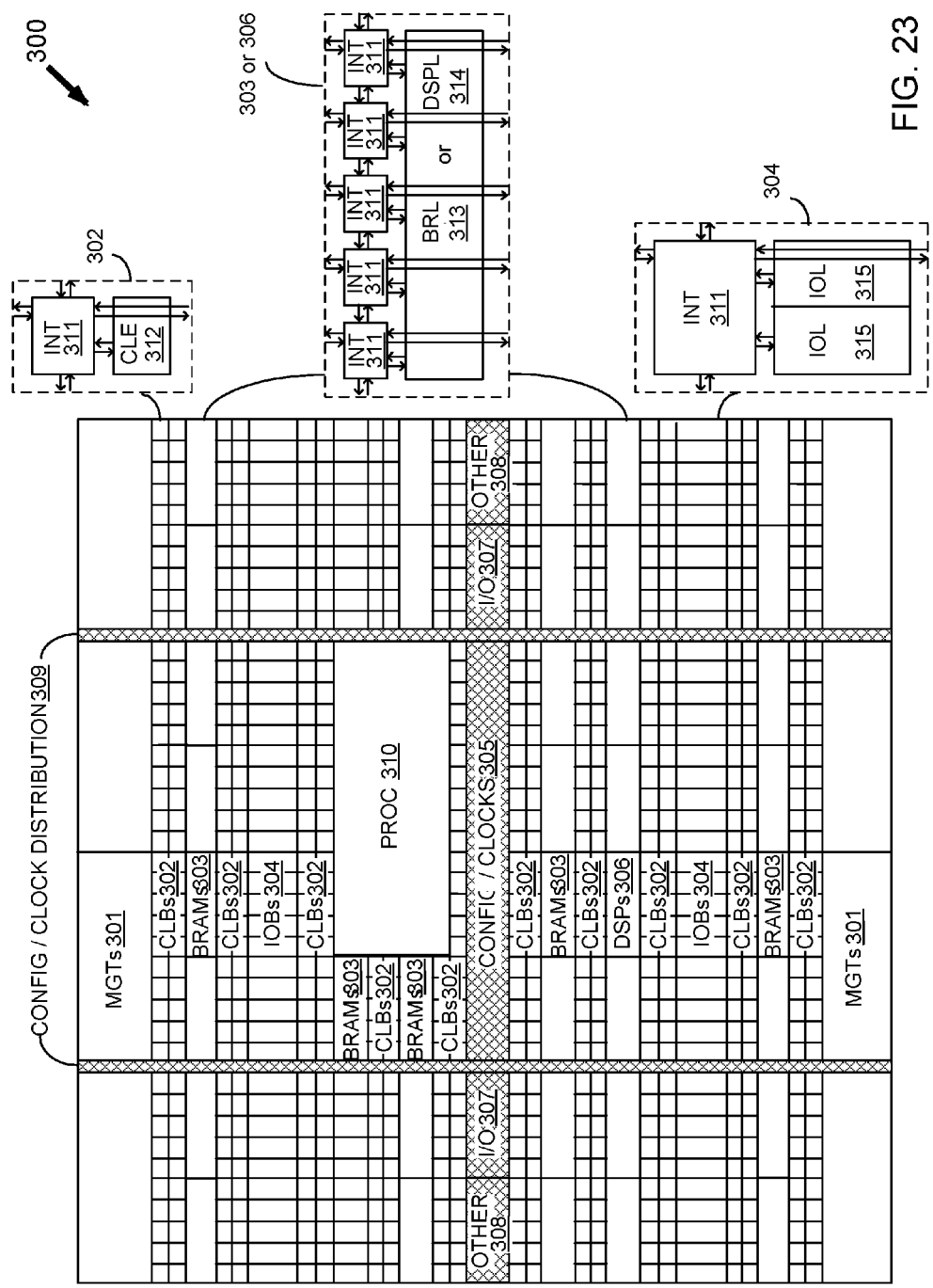
FIG. 23 is a simplified block diagram depicting an exemplary columnar Field Programmable Gate Array ("FPGA") architecture.

As noted above, advanced FPGAs can include several different types of programmable logic blocks in the array. For example, FIG. 23 illustrates an FPGA architecture 300 that includes a large number of different programmable tiles including multi-gigabit transceivers ("MGTs") 301, configurable logic blocks ("CLBs") 302, random access memory blocks ("BRAMs") 303, input/output blocks ("IOBs") 304, configuration and clocking logic ("CONFIG/CLOCKS") 305, digital signal processing blocks ("DSPs") 306, specialized input/output blocks ("I/O") 307 (e.g., configuration ports and clock ports), and other programmable logic 308 such as digital clock managers, analog-to-digital converters, system monitoring logic, and so forth. Some FPGAs also include dedicated processor blocks ("PROC") 310.

In some FPGAs, each programmable tile includes a programmable interconnect element ("INT") 311 having standardized connections to and from a corresponding interconnect element in each neighboring tile. Therefore, the programmable interconnect elements taken together implement the programmable interconnect structure for the illustrated FPGA. The programmable interconnect element 311 also includes the connections to and from the programmable logic element within the same tile, as shown by the examples included at the top of FIG. 23.

For example, a CLB 302 can include a configurable logic element ("CLE") 312 that can be programmed to implement user logic plus a single programmable interconnect element ("INT") 311. A BRAM 303 can include a BRAM logic element ("BRL") 313 in addition to one or more programmable interconnect elements. Typically, the number of interconnect elements included in a tile depends on the height of the tile. In the pictured embodiment, a BRAM tile has the same height as five CLBs, but other numbers (e.g., four) can also be used. A DSP tile 306 can include a DSP logic element ("DSPL") 314 in addition to an appropriate number of programmable interconnect elements. An 10B 304 can include, for example, two instances of an input/output logic element ("IOL") 315 in addition to one instance of the programmable interconnect element 311. As will be clear to those of skill in the art, the actual I/O pads connected, for example, to the I/O logic element 315 typically are not confined to the area of the input/output logic element 315.

In the pictured embodiment, a horizontal area near the center of the die (shown in FIG. 23) is used for configuration, clock, and other control logic. Vertical columns 309 extending from this horizontal area or column are used to distribute the clocks and configuration signals across the breadth of the FPGA.

Some FPGAs utilizing the architecture illustrated in FIG. 23 include additional logic blocks that disrupt the regular columnar structure making up a large part of the FPGA. The additional logic blocks can be programmable blocks and/or dedicated logic. For example, processor block 310 spans several columns of CLBs and BRAMs.

Note that FIG. 23 is intended to illustrate only an exemplary FPGA architecture. For example, the numbers of logic blocks in a row, the relative width of the rows, the number and order of rows, the types of logic blocks included in the rows, the relative sizes of the logic blocks, and the interconnect/logic implementations included at the top of FIG. 23 are purely exemplary. For example, in an actual FPGA more than one neighboring row of CLBs is typically included wherever the CLBs appear, to facilitate the efficient implementation of user logic, but the number of neighboring CLB rows varies with the overall size of the FPGA.

While the foregoing describes exemplary apparatus(es) and/or method(s), other and further examples in accordance with the one or more aspects described herein may be devised without departing from the scope hereof, which is determined by the claims that follow and equivalents thereof. Claims listing steps do not imply any order of the steps. Trademarks are the property of their respective owners.

What is claimed is:

1. A system for electro-absorption modulation, comprising:
    a waveguide;
    a photodetector configured with respect to the waveguide for detecting luminous intensity of an optical signal;
    an electro-absorption modulator configured with respect to the waveguide for electro-absorption modulation of the optical signal,
        the photodetector and the electro-absorption modulator being formed of same materials; and
    an integrated heating element located alongside and spaced apart from both the photodetector and the electro-absorption modulator, the integrated heating element configured for controllably heating the photodetector and the electro-absorption modulator.

2. The system according to claim 1, wherein the electro-absorption modulator is a segmented electro-absorption modulator.

3. The system according to claim 1, wherein:
    the waveguide has an ingress end configured for receiving the optical signal and an egress end configured for outputting the optical signal; and
    the photodetector is spaced apart from an ingress side of the electro-absorption modulator and located between the ingress end of the waveguide and the ingress side of the electro-absorption modulator.

4. The system according to claim 3, wherein:
    the waveguide has a first side associated with a first dopant portion of the waveguide and a second side opposite the first side associated with a second dopant portion of the waveguide, the first side and the second side of the waveguide being between the ingress end and the egress end of the waveguide;

the photodetector has a detector anode alongside the first side of the waveguide and a detector cathode alongside the second side of the waveguide, the detector anode and the detector cathode having surfaces respectively facing the first side of the waveguide and the second side of the waveguide aligned to one another for providing a first electric field across the waveguide from the first dopant portion to the second dopant portion to detect the luminous intensity of the optical signal;

the electro-absorption modulator has a modulator anode alongside the first side of the waveguide and a modulator cathode alongside the second side of the waveguide, the modulator anode and the modulator cathode having surfaces respectively facing the first side and the second side of the waveguide aligned to one another for providing a second electric field across the waveguide from the first dopant portion to the second dopant portion to modulate the optical signal; and the photodetector and the electro-absorption modulator are formed of same processing operations.

5. The system according to claim 4, wherein the integrated heating element is a first integrated heating element located alongside and spaced apart from both the detector anode and the modulator anode on an anode side with respect to the waveguide, the system further comprising:

a second integrated heating element located alongside and spaced apart from both the detector cathode and the modulator cathode on a cathode side with respect to the waveguide.

6. The system according to claim 3, wherein the photodetector is a first photodetector, the system further comprising:

a second photodetector located with respect to the waveguide for detecting optical modulation amplitude of the optical signal having modulation by the electro-absorption modulator, the second photodetector spaced apart from an egress side of the electro-absorption modulator being located between the egress end of the waveguide and the egress side of the electro-absorption modulator.

7. The system according to claim 6, wherein the integrated heating element is a first integrated heating element located alongside and spaced apart from both the first photodetector and the electro-absorption modulator on an anode side with respect to the waveguide for thermal control thereof, the system further comprising:

a second integrated heating element located alongside and spaced apart from both the first photodetector and the electro-absorption modulator on a cathode side with respect to the waveguide for thermal control thereof; and the first integrated heating element and the second integrated heating element being spaced apart from the second photodetector for thermal isolation.

8. The system according to claim 6, wherein the integrated heating element is a first integrated heating element located alongside and spaced apart from each of the first photodetector, the electro-absorption modulator and the second photodetector on an anode side with respect to the waveguide for thermal control thereof, the system further comprising:

a second integrated heating element located alongside and spaced apart from each of the first photodetector, the electro-absorption modulator and the second photodetector on a cathode side with respect to the waveguide for thermal control thereof.

9. The system according to claim 1, further comprising: a thermal tuning circuit coupled to the integrated heating element.

10. The system according to claim 9, wherein the thermal tuning circuit coupled to the integrated heating element comprises:

a current-controlled voltage source configured to receive a photocurrent signal from the photodetector to provide an output voltage signal;

a level tracking circuit configured to receive the output voltage signal to provide an eye opening adjustment signal;

a thermal controller configured to receive the eye opening adjustment signal to provide a thermal control signal; and a heater driver configured to receive the thermal control signal to provide a heater activation signal to the integrated heating element.

11. The system according to claim 9, wherein the photodetector is a first photodetector, the system further comprising:

a second photodetector located with respect to the waveguide for detecting optical modulation amplitude of the optical signal having modulation by the electro-absorption modulator; and wherein the thermal tuning circuit coupled to the integrated heating element comprises:

a first current-controlled voltage source configured to receive a first photocurrent signal from the first photodetector to provide a first output voltage signal;

a second current-controlled voltage source configured to receive a second photocurrent signal from the second photodetector to provide a second output voltage signal;

a level tracking circuit configured to receive the first output voltage signal and the second output voltage signal to provide an eye opening adjustment signal;

a thermal controller configured to receive the eye opening adjustment signal to provide a thermal control signal; and a heater driver configured to receive the thermal control signal to provide a heater activation signal to the integrated heating element.

12. A system for electro-absorption modulation, comprising:

a waveguide;

an electro-absorption modulator configured with respect to the waveguide for electro-absorption modulation of an optical signal to provide an modulated optical signal;

a photodetector located with respect to the waveguide for detecting optical modulation amplitude of the modulated optical signal having modulation by the electro-absorption modulator, the photodetector located between an egress end of the waveguide and an egress side of the electro-absorption modulator, an integrated heating element located alongside and spaced apart from the electro-absorption modulator and spaced apart from the photodetector;

a level tracking circuit configured to provide an eye opening adjustment signal based on a photocurrent signal from the photodetector; and a thermal tuning circuit coupled to the integrated heating element and configured for controllably heating the electro-absorption modulator with the integrated heating element based on the eye opening adjustment signal.

13. The system according to claim 12, wherein:
the waveguide has an ingress end configured for receiving the optical signal and the egress end configured for outputting the optical signal, the waveguide having a first side associated with a first dopant portion of the waveguide and a second side opposite the first side associated with a second dopant portion of the waveguide, the first side and the second side being between the ingress end and the egress end;
the electro-absorption modulator has a modulator anode alongside the first side of the waveguide and a modulator cathode alongside the second side of the waveguide, the modulator anode and the modulator cathode having surfaces respectively facing the first side and the second side of the waveguide aligned to one another for providing a first electric field across the waveguide from the first dopant portion to the second dopant portion to modulate the optical signal; and
the photodetector has a detector anode alongside the first side of the waveguide and a detector cathode alongside the second side of the waveguide, the detector anode and the detector cathode having surfaces respectively facing the first side and the second side of the waveguide aligned to one another for providing a second electric field across the waveguide from the first dopant portion to the second dopant portion to detect the optical modulation amplitude of the modulated optical signal.

14. The system according to claim 12, wherein the integrated heating element is a first integrated heating element located alongside and spaced apart from both a detector anode of the photodetector and a modulator anode of the electro-absorption modulator both being on an anode side with respect to the waveguide, the system further comprising:
a second integrated heating element located alongside and spaced apart from both a detector cathode of the photodetector and a modulator cathode of the electro-absorption modulator both being on a cathode side with respect to the waveguide.

15. The system according to claim 12, further comprising:
a heater driver configured to receive, from the thermal tuning circuit, a thermal control signal to provide a heater activation signal to the integrated heating element.

16. The system according to claim 15, wherein the thermal tuning circuit coupled to the integrated heating element comprises:
a current-controlled voltage source configured to receive the photocurrent signal to provide an output voltage signal;
a thermal controller configured to receive the eye opening adjustment signal to provide the thermal control signal;

wherein:
the thermal tuning circuit is of an electrical domain integrated circuit; and
the photodetector, the electro-absorption modulator and the integrated heating element are of a photonic integrated circuit.

17. A method for electro-absorption modulation, comprising:
receiving an optical signal by a waveguide at an ingress end thereof;
receiving a modulation code corresponding to input data by an electro-absorption modulator;
detecting luminous intensity with a first photodetector of the optical signal for providing a first photocurrent signal proportional to the detected luminous intensity;
electro-absorption modulating the optical signal passing through the waveguide with the electro-absorption modulator;
detecting optical modulation amplitude with a second photodetector for the optical signal for association with a data eye of the optical signal for providing a second photocurrent signal proportional to the detected optical modulation amplitude;
level tracking responsive to at least one of the first photocurrent signal and the second photocurrent signal for the modulation code to provide an eye opening adjustment signal;
controllably heating the photodetector and the electro-absorption modulator based on the eye opening adjustment signal; and
outputting the optical signal at an egress end of the waveguide as the optical signal modulated responsive to the electro-absorption modulation for the modulation code.

18. The method according to claim 17, further comprising heating with at least one heating element located side-by-side lengthwise alongside and spaced apart from the first photodetector and the electro-absorption modulator.

19. The method according to claim 18, further comprising:
current-controlled voltage sourcing a first output voltage signal responsive to the first photocurrent signal;
current-controlled voltage sourcing a second output voltage signal responsive to the second photocurrent signal;
level tracking responsive to at least one of the first output voltage signal and the second output voltage to provide the eye opening adjustment signal;
providing a thermal control signal by a thermal controller responsive to the eye opening adjustment signal; and
providing a heater activation signal by a heater driver to the at least one heating element responsive to the thermal control signal.

20. The system according to claim 12, wherein the photodetector and the electro-absorption modulator are formed of same materials.

* * * * *